(12) United States Patent
Chan et al.

(10) Patent No.: US 7,928,154 B2
(45) Date of Patent: Apr. 19, 2011

(54) METHODS OF PREPARING POLYMER-ORGANOCLAY COMPOSITES AND ARTICLES DERIVED THEREFROM

(75) Inventors: Kwok Pong Chan, Troy, NY (US); Sarah Elizabeth Genovese, Delmar, NY (US); Erik C. Hagberg, Decatur, IL (US); David Bruce Hall, Ballston Lake, NY (US); John Lester Maxam, Saratoga Springs, NY (US); Tara J. Mullen, Mt. Vernon, IN (US); Roy Ray Odle, Mt. Vernon, IN (US); Albert Santo Stella, Voorheesville, NY (US); James Mitchell White, Niskayuna, NY (US)

(73) Assignee: Sabic Innovative Plastics IP B.V. (NL)

( * ) Notice: Subject to any disclaimer, the term of this patent is extended or adjusted under 35 U.S.C. 154(b) by 400 days.

(21) Appl. No.: 11/766,456

(22) Filed: Jun. 21, 2007

(65) Prior Publication Data

US 2008/0004391 A1    Jan. 3, 2008

Related U.S. Application Data

(60) Provisional application No. 60/805,821, filed on Jun. 26, 2006, provisional application No. 60/945,150, filed on Jun. 20, 2007.

(51) Int. Cl.
*C08K 9/04* (2006.01)
*C08K 3/34* (2006.01)
(52) U.S. Cl. .................. 524/445; 524/442; 524/492
(58) Field of Classification Search .................. 524/442, 524/492, 445
See application file for complete search history.

(56) References Cited

U.S. PATENT DOCUMENTS 3,383,092 A    5/1968   Cazier
3,671,487 A    6/1972   Abolins
(Continued)

FOREIGN PATENT DOCUMENTS

EP    0178079 A1    4/1986
(Continued)

OTHER PUBLICATIONS

Moy, et al., "Synthesis of Hydroxyl-Containing Polyimides Derived from 4,6-Diamino-Resorchinol Dihydrochloide and Aromatic Tetracarboxylic Dianhydrides," Journal of Polymer Science: Part A: Polymer Chemistry, vol. 32, pp. 1903-1908 (Jul. 1994).

(Continued)

*Primary Examiner* — Satya B Sastri
(74) *Attorney, Agent, or Firm* — Cantor Colburn LLP; Diderico van Eyl

(57) ABSTRACT

A method for preparing a polymer-organoclay composite composition comprises combining a solvent and an unexfoliated organoclay to provide a first mixture, wherein the unexfoliated organoclay comprises alternating inorganic silicate layers and organic layers, and has an initial spacing between the silicate layers; exposing the first mixture to an energized condition of a sufficient intensity and duration to increase the initial spacing of the inorganic silicate layers, to provide a second mixture; contacting the second mixture with a polymer composition so that the polymer composition fills at least one region located between at least one pair of silicate layers, wherein the polymer composition is at least partially soluble in the solvent; and removing at least a portion of the solvent from the second mixture, wherein the inorganic silicate layers remain separated by the polymer after removal of the solvent.

24 Claims, 4 Drawing Sheets

U.S. PATENT DOCUMENTS

| | | | |
|---|---|---|---|
| 3,723,373 | A | 3/1973 | Lucas |
| 3,803,085 | A | 4/1974 | Takehoshi et al. |
| 3,847,867 | A | 11/1974 | Heath et al. |
| 3,850,885 | A | 11/1974 | Takekoshi et al. |
| 3,852,242 | A | 12/1974 | White |
| 3,855,178 | A | 12/1974 | White et al. |
| 3,905,942 | A | 9/1975 | Takekoshi et al. |
| 3,972,902 | A | 8/1976 | Heath et al. |
| 3,983,093 | A | 9/1976 | Williams, III et al. |
| 4,115,341 | A | 9/1978 | Boldebuck et al. |
| 4,157,996 | A | 6/1979 | Boldebuck et al. |
| 4,307,226 | A | 12/1981 | Bolon et al. |
| 4,360,633 | A | 11/1982 | Bolon et al. |
| 4,374,972 | A | 2/1983 | Bolon et al. |
| 4,443,591 | A | 4/1984 | Schmidt et al. |
| 4,455,410 | A | 6/1984 | Giles, Jr. |
| 4,870,194 | A | 9/1989 | Molinaro et al. |
| 4,957,801 | A * | 9/1990 | Maranci et al. ............... 428/147 |
| 5,021,168 | A | 6/1991 | Molinaro et al. |
| 5,164,460 | A | 11/1992 | Yano et al. |
| 5,229,482 | A | 7/1993 | Brunelle |
| 5,260,407 | A | 11/1993 | Saruwatari et al. |
| 5,460,890 | A | 10/1995 | Okahashi et al. |
| 5,478,915 | A | 12/1995 | Amone et al. |
| 5,707,439 | A | 1/1998 | Takekoshi et al. |
| 5,807,629 | A | 9/1998 | Elspass et al. |
| 6,028,203 | A | 2/2000 | Brunelle et al. |
| 6,057,035 | A * | 5/2000 | Singh et al. ................... 428/403 |
| 6,117,932 | A | 9/2000 | Hasegawa et al. |
| 6,232,388 | B1 | 5/2001 | Lan et al. |
| 6,384,121 | B1 | 5/2002 | Barbee et al. |
| 6,387,996 | B1 | 5/2002 | Lan et al. |
| 6,410,142 | B1 | 6/2002 | Chen et al. |
| 6,579,927 | B1 * | 6/2003 | Fischer ......................... 524/445 |
| 6,653,388 | B1 | 11/2003 | Barbee et al. |
| 6,906,127 | B2 | 6/2005 | Liang et al. |
| 2004/0127627 | A1 | 7/2004 | Gilmer et al. |
| 2005/0234219 | A1* | 10/2005 | Silvi et al. ..................... 528/480 |
| 2005/0272847 | A1* | 12/2005 | Wang et al. ................... 524/442 |
| 2007/0123682 | A1 | 5/2007 | Raj et al. |
| 2007/0299186 | A1 | 12/2007 | Chan et al. |
| 2007/0299187 | A1 | 12/2007 | Chan et al. |
| 2007/0299188 | A1 | 12/2007 | Chan et al. |
| 2007/0299189 | A1 | 12/2007 | Cao et al. |
| 2008/0015330 | A1 | 1/2008 | Chan et al. |
| 2008/0021175 | A1 | 1/2008 | Chan et al. |
| 2008/0044639 | A1 | 2/2008 | Chan et al. |
| 2008/0044682 | A1 | 2/2008 | Chan et al. |
| 2008/0044683 | A1 | 2/2008 | Chan et al. |
| 2008/0044684 | A1 | 2/2008 | Chan et al. |
| 2009/0043024 | A1 | 2/2009 | Brunelle et al. |

FOREIGN PATENT DOCUMENTS

| | | |
|---|---|---|
| EP | 0459472 A1 | 12/1991 |
| EP | 1350815 A1 | 10/2003 |
| EP | 1473328 A1 | 11/2004 |
| WO | 0078540 A1 | 12/2000 |
| WO | WO 0078540 A1 * | 12/2000 |
| WO | WO 2005028363 A2 * | 3/2005 |

OTHER PUBLICATIONS

European Patent Office, PCT International Search Report, International Application No. PCT/US2007/071205, Date of Mailing: Oct. 21, 2008.
European Patent Office, PCT Written Opinion, International Application No. PCT/US2007/071205, Date of Mailing: Oct. 21, 2008.
Park, Cheol et al., "Polyimide/silica Hybrid-Clay Nanocomposites" Polymer vol. 46, No. 23 (Nov. 14, 2005) pp. 9694-9701, Elsevier Science Publishers, B.V.
International Search Report for PCT/US2007/072019 International Filing Date Jun. 25, 2007, Maling Date Jan. 8, 2008 (6 pages).
Written Opinion of the International Searching Authority for PCT/US2007/072019 International Filing Date Jun. 25, 2007, Mailing Date Jan. 8, 2008 (9 pages).
Lertwimolnun, W. et al. Polymer, 46, 3462, (2005).
Zhu, L. et al. J. of Applied Polymer Science, 93, 1891, (2004).
Lee, E. C. et al. Polymer Engineering and Science, 44, 1773, (2004).
Ton-That, M. -T. et al. Polymer Engineering and Science, 44, 1212, (2004).
Lam, C. et al. Materials Letters, 59, 1369, (2005).
Wang, J. et al. Ultrasonics Sonochemistry, 12, 165, (2005).
Yu, Z. et al. Journal of Polymer Science: Part B: Polymer Physics, 43, 1100, (2005).
Hasegawa, N. et al. Polymer, 44, 2933, (2003).
Dasari, A. et al. Composites Science and Technology, 65, 2314, (2005).
Kato, M. et al. Polymer Engineering and Science, 44, 1205, (2004).
Wang, K. et al. Langmuir, 21, 3613, (2005).
Chen, B. et al. Chemistry of Materials, 16, 4864, (2004).
Zhong, Y. et al. Polymer, 46, 3006, (2005).
Morgan, A. B. et al. Macromolecules, 34, 2735, (2001).
Park, J.H. et al. Macromolecules, 36, 2758, (2003).
Park, J.H. et al. Polymer, 45, 7673, (2004).
Paul, M.-A. et al. Macromolecular Chemistry and Physics, 206, 484, (2005).
Morgan, A.B. et al. Polymer, 45, 8695, (2004).
Chang, J. -H. et al. Polymer Engineering and Science, 41, 1514, (2001).
Ma, J. et al. Polymer, 44, 4619, (2003).
Jeon, H.S. et al. Polymer, 44, 5749, (2003).
Burgentzle, D. et al. J. of Colloid and Interface Science, 278, 26, (2004).
Perez-Maqueda, L.A. et al. Journal of the European Ceramic Society, 24, 2793, (2004).
JP2005298751, Polyester Resin Composition and Polyester Film, Publication Date: Oct. 27, 2005, Abstract, 1 page.
Panek, G. et al, "Heterogeneity of the Surfactant Layer in Organically Modified Silicates and Polymer-Layered Silicate Composites", MACROMOLECULES, Feb. 28, 2006, p. 2191-2200, vol. 39, No. 6, American Chemical Society.
Sun, Xuehui et al, "Synthesis and Properties of Ionic, Rigid-Rod, and Thermally Stable Polymides Containing Bipyridinium Triflates", MACROMOLECULES, 1998, p. 4291-4296, vol. 31, No. 13. American Chemical Society.
Burgentzle et al.; "Solvent-Based Nanocomposite Coatings I. Dispersion of Organophilic Montmorillonite in Organic Solvents"; Journal of Colloid and Interface Science; vol. 278 (2004); pp. 26-39.
Chang et al.; "Preparation and Characterization of Polyimide Nanocomposites with Different Organo-Montmorillonites"; Polymer Engineering and Science; vol. 41, No. 9 (Sep. 2001); pp. 1514-1520.
Chen et al.; "Synthesis of Disordered and Highly Exfoliated Epoxy/Clay Nanocomposites Using Organoclay with Catalytic Function via Acetone—Clay Slurry Method"; Chem. Matter; vol. 16 (2004); pp. 4864-4866.
Dasart et al.; "Clay Exfoliation and Organic Modification on Wear of Nylon 6 Nanocomposites Processed by Different Routes"; Composites Science and Technology; vol. 65 (2005); pp. 2314-2328.
Hasegawa et al.; "Nylon 6/Na-montmorillonite Nanocomposites Prepared by Compounding Nylon 6 with Na-montmorillonite Slurry"; Polymer; vol. 44 (2003); pp. 2933-2937.
Jeon et al.; "Characterization of Polyisoprene-Clay Nanocomposites Prepared by Solution Blending"; Polymer; vol. 44 (2003); pp. 5749-5758.
Kato et al.; "Development of New Production Method for a Polypropylene-Clay Nanocomposite"; Polymer Engineering and Science; vol. 44, No. 7 (Jul. 2004); pp. 1205-1211.
Lam et al.; "Effect of Ultrasound Sonication in Nanoclay Clusters of Nanoclay/Epoxy Composites"; Materials Letters; vol. 59 (2005); pp. 1369-1372.
Lee et al.; "Exfoliation and Dispersion Enhancement in Polypropylene Nanocomposites by In-Situ Melt Phase Ultrasonication"; Polymer Engineering and Science; vol. 44, No. 9 (Sep. 2004); pp. 1773-1782.
Lertwimolnum et al.; "Influence of Compatibilizer and Processing Conditions on the Dispersion of Nanoclay in a Polypropylene Matrix"; Polymer; vol. 46 (2005); pp. 3462-3471.

Ma et al.; "A New Approach to Polymer/Montmorillonite Nanocomposites"; Polymer; vol. 44 (2004); pp. 4619-4624.

Morgan et al.; "Characterization of the Dispersion of Clay in a Polyetherimide Nanocomposite"; Macromolecules; vol. 34 (2001); pp. 2735-2738.

Morgan et al.; "Exfoliated Polystyrene-Clay Nanocomposites Synthesized by Solvent Blending wtih Sonication"; Polymer; vol. 45 (2004); pp. 8695-8703.

Park et al ; "Adverse Effects of Thermal Dissociation of Alkyl Ammonium Ions on Nanoclay Exfoliation in Epoxy-Clay Systems"; Polymer; vol. 45 (2004); pp. 7673-7679.

Park et al.; "Mechanism of Exfoliation of Nanoclay Particles in Epoxy-Clay Nanocomposites"; Macromolecules; vol. 36 (2003); pp. 2758-2768.

Paul et al.;"(Plasticized) Polylactide/(Organo-)Clay Nanocomposites by in situ Intercalative Polymerization"; Macromol. Chem. Phys.; vol. 206 (2005); pp. 484-498.

Perez-Maqueda et al.; "The Influence of Sonication on the Thermal Behavior of Muscovite and Biotite"; Journal of the European Ceramic Society; vol. 24 (2004); pp. 2793-2801.

STIC Structure Search 11766227—342596—EICSEARCH.pdf; Submitted Sep. 13, 2010; Received Sep. 22, 2010.

STIC Structure Search 11766227—SEARCH.pdf; Submitted May 20, 2010; Received Jun. 4, 2010.

Takekoshi et al.; "Polyetherimides. I. Preparation of Dianhydrides Containing Aromatic Ether Groups"; Journal of Polymer Science: Polymer Chemistry Edition; vol. 23 (1985); pp. 1759-1769.

Ton-That et al.; "Polyolefin Nanocomposites: Formulation and Development"; Polymer Engineering and Science; vol. 44, No. 7 (Jul. 2004); pp. 1212-1219.

U.S. Appl. No. 11/766,238; Filed: May 21, 2007; "Compositions and Methods for Polymer Composites"; Available in Image File Wrapper.

U.S. Appl. No. 11/766,274; Filed: May 21, 2007; "Compositions and Methods for Polymer Composites"; Available in Image File Wrapper.

U.S. Appl. No. 11/766,300; Filed: Jun. 21, 2007; "Compositions and Methods for Polymer Composites"; Available in Image File Wrapper.

U.S. Appl. No. 11/766,355; Filed: Jun. 21, 2007; "Compositions and Methods for Polymer Composites"; Available in Image File Wrapper.

U.S. Appl. No. 11/766,843; Filed: Jun. 22, 2007; "Compositions and Methods for Polymer Composites"; Available in Image File Wrapper.

Wang et al.; "Preparation of Highly Exfoliated Epoxy/Clay Nanocomposites by "Slurry Compounding": Process and Mechanisms"; Langmuir; vol. 21, No. 8 (2005); pp. 3613-3618.

Wang et al.; "Sonochemical One-Directional Growth of Montmorillonite-Polystyrene Nanocomposite"; Ultrasonics Sonochemistry; vol. 12 (2005); pp. 165-168.

Yu et al.; "Water-Assisted Melt Compounding of Nylon-6/Pristine Montmorillonite Nanocomposites"; Journal of Polymer Science: Part B: Polymer Physics; vol. 43 (2005); pp. 1100-1112.

Zhong et al.; "Synthesis and Rheological Properties of Polystyrene/Layered Silicate Nanocomposite"; Polymer; vol. 46 (2005); pp. 3006-3013.

Zhu et al.; "Effects of Process Conditions and Mixing Protocols on Structure of Extruded Polypropylene Nanocomposites"; Journal of Applied Polymer Science; vol. 93 (2004); pp. 1891-1899.

* cited by examiner

| Ex. No. | Modifier/ Clay system | Solvent | Polyetherimide | TEM Micrograph |
|---|---|---|---|---|
| 22 | 7 | Veratrole | BPADA-mPD |  |
| 23 | 10 | Veratrole | BPADA-mPD |  |
| 24 | 9 | Veratrole | BPADA-mPD |  |
| 25 | 7 | Veratrole | BPADA-DDS |  |
| 26 | 10 | Veratrole | BPADA-DDS |  |

| Ex. No. | Modifier/ Clay system | Solvent | Polyetherimide | TEM Micrograph |
|---|---|---|---|---|
| 27 | 9 | Veratrole | BPADA-DDS |  |
| 28 | 8 | Veratrole | BPADA-DDS |  |
| 29 | 7 | 50/50 Veratrole/o-dichlorobenze | BPADA-mPD |  |
| 30 | 9 | Anisole | BPADA-mPD |  |
| 31 | 9 | Veratrole | BPADA-mPD |  |
| 32 | 9 | 50/50 Veratrole/o-dichlorobenze | BPADA-mPD |  |

| Ex. No. | Modifier/ Clay system | Solvent | Polyetherimide | TEM Micrograph |
|---|---|---|---|---|
| 33 | 7 | Veratrole | BPADA-DDS |  |
| 34 | 7 | 50/50 Veratrole/o-dichlorobenze | BPADA-DDS |  |
| 35 | 9 | Veratrole | BPADA-DDS |  |
| 36 | 9 | 50/50 Veratrole/o-dichlorobenze | BPADA-DDS |  |
| 37 | 7 | Veratrole | BPADA-mPD |  |

Devolatization · Precipitation

Flow cell (5% silicate) · Probe (3% silicate)

METHODS OF PREPARING POLYMER-ORGANOCLAY COMPOSITES AND ARTICLES DERIVED THEREFROM

CROSS REFERENCE TO RELATED APPLICATION

This application claims priority to U.S. Provisional Application Ser. No. 60/805,821, filed Jun. 26, 2006, and U.S. Provisional Application Ser. No. 60/945,150, filed on Jun. 20, 2007; both which are incorporated herein by reference in their entirety.

FIELD

This invention is directed to methods of preparing polymer-organoclay composites and uses of such composites, for example in the formation of a solvent cast film. The present disclosure also describes a solvent cast film comprising a polyimide and methods for the manufacture of such articles. The film is formed by polymerization of a dianhydride component and a diamine component, and has a Tg of between 180° C. and 450° C., specifically 190° C. or greater, and wherein the film has: a) a CTE of less than 70 ppm/° C., specifically less than 60 ppm/° C.; b) a thickness between 0.1 micrometers and 250 micrometers, specifically 5 to 250 micrometers; and, c) contains less than 5% residual solvent by weight.

BACKGROUND OF THE INVENTION

Thermoplastic sheets and films have a broad range of applications. For instance, thermoplastic films and sheets can be found in automotive applications, electronic applications, military applications, appliances, industrial equipment, and furniture.

One important use of films is their use as substrates, or coatings on, flexible circuit applications. In order to serve in this role a new film should meet two requirements critical for flexible circuit substrates, namely low coefficient of thermal expansion (CTE) and high temperature survivability (especially when a high temperature fabrication step is employed).

Low CTE is necessary to match, as closely as possible, the CTE of copper (CTE=17 ppm/° C.). This keeps the film from curling upon temperature change when the film is a substrate for a copper layer, or copper circuit traces. Low CTE also prevents unmatched changes in dimension between the copper and substrate layers upon thermal cycling, which increases the lifetime of the final flexible circuit by reducing stress and fatigue on the patterned copper traces. In other words, the properties of flexible circuit boards are benefited when their film substrate and applied conductive metal layer expand and contract at the same rate. When these layers don't expand and contract at the same rate issues regarding the adhesion, and orientation of the layers can and do arise. While a CTE of less than 70 ppm/° C., specifically less than 60 ppm/° C., even more specifically less than 30 ppm/° C. will allow low warpage upon thermal cycling and is a common goal, better results will be achieved as the CTE of the film becomes closer to the CTE of copper.

CTE is tested by a TMA or Thermomechanical Analysis. The dimension change of a film sample is determined as a function of temperature, and from the slope of this change, the CTE is calculated. Typically, the CTE must be measured for the temperature range that the film is expected to see during flex circuit processing. A temperature range of 20 to 250° C. is a reasonable temperature range for determination of the CTE.

High temperature survivability can also be an important property for the substrate film to survive the soldering process during flex circuit fabrication. The film should exhibit survivability for short periods at elevated temperatures of, for example, 260° C. for new lead-free soldering processes. The standard test for temperature survivability is the solder float test, where a small piece of film is affixed to a cork and is immersed for 10 seconds in molten solder. The film is then removed, the solder is wiped off, and the film is examined. If there is any visible warpage or bubbling, the film fails the test. While there is not a standard thickness for this test, the minimum thickness at which the film passes the solder float test can be reported. Temperatures of 260° C. and 288° C. are standard solder float temperatures for lead-eutectic and lead-free solders, respectively.

Low CTE and high temperature resistance requirements for flexible circuit substrates have been addressed through the use of polyimide films. Many commercial polyimide (PI) films have a high glass transition temperature (greater than 350° C.), and can be partially crosslinked, giving exceptional temperature survivability. The polymer molecules in these films are stressed slightly as they are produced, leading to alignment of the polymer molecules and giving PI films a low CTE. Since the films never see temperatures above the glass transition temperature (Tg) of the material, the stress is never able to relax and the films are dimensionally stable at flex fabrication temperatures.

As thermoplastic sheets and films are used in an increasing wide array of applications the need for thermoplastic sheets and films that can withstand elevated temperatures for appropriate periods of time without substantial degradation is growing. There is a continuing need for films having: a) a CTE under seventy ppm/° C., specifically under thirty ppm/° C. and as close to the CTE of copper as technically possible; and b) high thermal survivability.

SUMMARY OF THE INVENTION

The present invention is directed to methods of preparing polymer-organoclay composites and articles derived therefrom, such as thermoplastic sheets and films. The sheets and films are useful in a broad range of applications, for instance in automotive applications, electronic applications, military applications, appliances, industrial equipment, and furniture.

In one embodiment, a method for preparing a polymer-organoclay composite composition comprises combining a solvent and an unexfoliated organoclay to provide a first mixture, wherein the unexfoliated organoclay comprises alternating inorganic silicate layers and organic layers, and has an initial spacing between the silicate layers; exposing the first mixture to an energized condition of a sufficient intensity and duration to increase the initial spacing of the inorganic silicate layers, to provide a second mixture; contacting the second mixture with a polymer composition so that the polymer composition fills at least one region located between at least one pair of silicate layers, wherein the polymer composition is at least partially soluble in the solvent; and removing at least a portion of the solvent from the second mixture, wherein the inorganic silicate layers remain separated by the polymer after removal of the solvent.

In another embodiment, a method for preparing a polymer-organoclay composite composition comprises: combining a solvent and an unexfoliated organoclay to provide a first mixture, wherein the organoclay comprises alternating inorganic silicate layers and organic layers, and a quaternary organic cation of formula (1)

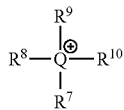

(1)

wherein Q is phosphorous or nitrogen; and $R^7$, $R^8$, $R^9$, and $R^{10}$ are independently a $C_1$-$C_{20}$ aliphatic radical, a $C_5$-$C_{20}$ cycloaliphatic radical, a $C_2$-$C_{20}$ aromatic radical, or a polymer chain, and wherein the organoclay further has an initial spacing between the silicate layers; exposing the first mixture to an energized condition to form a second mixture, wherein the energized condition is of a sufficient intensity and duration to effect a net increase the initial spacing of the inorganic silicate layers of the organoclay composition; contacting the second mixture with a polyimide that separates the inorganic silicate layers to form a third mixture, wherein the polyimide is at least partially soluble in the solvent; and removing at least a portion of the solvent from the third mixture, wherein the silicate layers remain separated by the polymer after removal of the solvent.

Another method for preparing a polymer-organoclay composite composition comprises combining a solvent and an unexfoliated organoclay to form a first mixture, wherein the organoclay comprises alternating inorganic silicate layers and organic layers, and has an initial spacing between the silicate layers; exposing the first mixture to an energized condition of a sufficient intensity and duration to increase the initial spacing of the inorganic silicate layers, to form a second mixture; contacting the first or second mixture with a polymer precursor; polymerizing the polymer precursor to form a polymer; and removing at least a portion of the solvent from the second mixture, wherein the inorganic silicate layers remain separated by the polymer after removal of the solvent.

In another embodiment, a method for preparing a polymer-organoclay composite composition comprises combining a solvent, an unexfoliated organoclay, a dianhydride component, and a diamine component to form a first mixture, wherein the organoclay comprises alternating inorganic silicate layers and organic layers, and has an initial spacing between the silicate layers; exposing the first mixture to an energized condition of a sufficient intensity and duration to increase the initial spacing of the inorganic silicate layers, to form a second mixture; polymerizing the dianhydride component and the diamine component to form a polyamic acid; and removing at least a portion of the solvent from the polyamic acid mixture to provide a polyimide, wherein the inorganic silicate layers remain separated by the polyimide after removal of the solvent.

In another embodiment an article comprises a polymer-organoclay composite prepared by the above methods.

DETAILED DESCRIPTION OF THE INVENTION

Figure 1:
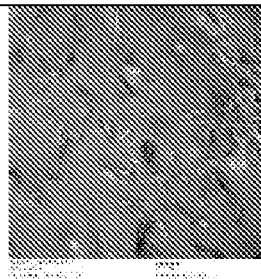
FIG. 1 shows transmission electron microscope (TEM) images of modified nanosilicates sonicated in veratrole and suspended in various polyetherimides.
Figure 1:
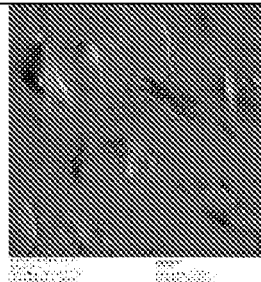
Figure 1:
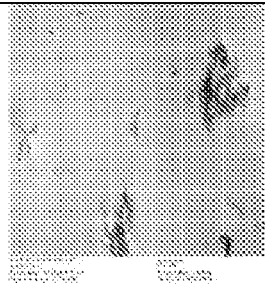
Figure 1:
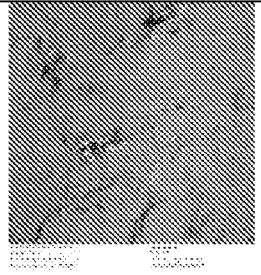
Figure 1:
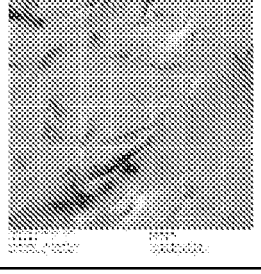
Figure 2:
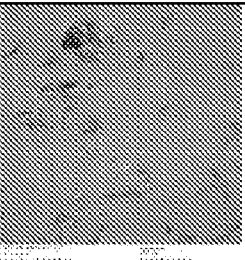
FIG. 2 shows TEM images of modified nanosilicates sonicated in various solvents and suspended in various polyetherimides.
Figure 2:
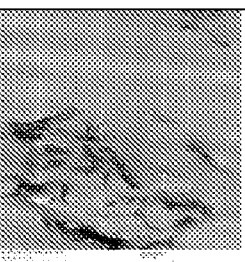
Figure 2:
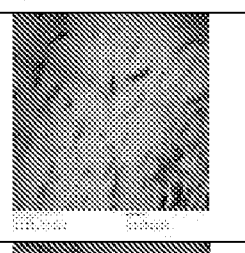
Figure 2:
Figure 2:
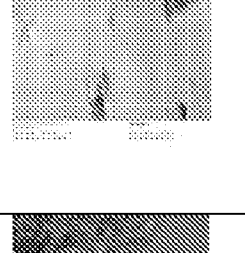
Figure 2:
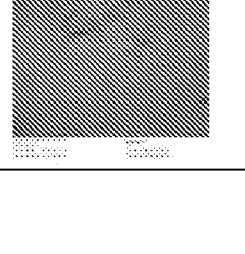

As thermoplastic sheets and films are used in the specification and the claims which follow, reference will be made to a number of terms which shall be defined to have the following meanings. The singular forms "a," "an," and "the" include plural referents unless the context clearly dictates otherwise. Unless defined otherwise, technical and scientific terms used herein have the same meaning as is commonly understood by one of skill in the art. Compounds are described using standard nomenclature.

Other than in the operating examples or where otherwise indicated, all numbers or expressions referring to quantities of ingredients, reaction conditions, and the like, used in the specification and claims are to be understood as modified in all instances by the term "about." The term "combination thereof" means that one or more of the listed components is present, optionally together with one or more like components not listed. Various numerical ranges are disclosed in this patent application. Because these ranges are continuous, they include every value between the minimum and maximum values. Unless expressly indicated otherwise, the various numerical ranges specified in this application are approximations. The endpoints of all ranges directed to the same component or property are inclusive of the endpoint and independently combinable.

For purposes of the present invention, a "film" is a flat section of thermoplastic resin or other material that is extremely thin in comparison to its length and breadth.

The term "casting" refers to a process of molding or forming wherein impressions are made with fluent or molten materials as by pouring into a mold or onto a sheet with hardening or setting of said material in said mold or on said sheet.

A "solvent cast film" is a film formed through the casting of fluids on a forming surface to form a sheet or web with removal of solvent from the cast liquid.

All ASTM tests and data are from the 1991 edition of the Annual Book of ASTM Standards unless otherwise indicated.

"Coefficient of thermal expansion" is the increment in volume of a unit volume of polymer for a rise of temperature of 1° C. at constant pressure. For the present invention CTE measurements were performed by thermo-mechanical analysis (TMA) with a thermal ramp rate of 5° C./minute. Test specimen dimensions were 23 mm in length by 5 mm in width. Test specimens were subjected to a first heat from 0° C. to 250° C. at 5° C./min heating rate and CTE values were determined under a force of 0.05 Newtons from the slope of length change over the temperature range from 30° C. to 200° C.

"Chemical resistance" is the ability of solid materials to resist damage by chemical reactivity or solvent action, and can be determined in accordance with ASTM Test D543-06.

"Dielectric Constant" (permittivity constant): between any two electrically charged bodies there is a force (attraction or repulsion) that varied according to the strength of the charges, q1 and q2, the distance between the bodies, r, and a characteristic of the medium separating the bodies (the dielectric) known as the dielectric constant, ∈. This force is given by the equation: $F=q1 \cdot q2/(\in \cdot r^2)$.

"Flexural Modulus" (flex modulus) is the ratio, within the elastic limit, of the applied stress in the outermost fibers of a test specimen in three-point, static flexure, to the calculated strain in those outermost fibers, and can be determined according to ASTM Test D790 or D790M.

"Flexural Strength" (flexural modulus of rupture) is the maximum calculated stress in the outermost fibers of a test bar subjected to three-point loading at the moment of cracking or breaking. ASTM Test D 790 and D 790M are widely used for measuring this property. For most plastics, flexural strength is usually substantially higher than the straight tensile strength.

"Glass Transition" is a reversible change that occurs in an amorphous polymer or in amorphous regions of a partly crystalline polymer when it is heated from a very low temperature into a certain range, peculiar to each polymer, characterized by a rather sudden change from a hard, glassy, or brittle condition to a flexible or elastomeric condition. Physical properties such as coefficient of thermal expansion, specific heat, and density, usually undergo changes in their temperature derivatives at the same time. During the transition, the molecular chains, normally coiled, tangled, and motionless at the lower temperatures, become free to rotate and slip past each other.

"Glass Transition Temperature" (Tg) is the approximate midpoint of the temperature range over which the glass transition occurs. Tg is not obvious (like a melting point), and is detected by changes, with rising temperature, in secondary properties such as the rate of change with temperature of specific volume or electrical or mechanical properties. Moreover, the observed Tg can vary significantly with the specific property chosen for observation and on experimental details such as the rate of heating or electrical frequency. A reported Tg should therefore be viewed as an estimate. The most reliable estimates are normally obtained from the loss peak in dynamic-mechanical tests or from dilatometric data. For purposes of the present invention, the glass transition temperature (Tg) is determined by the maximum point of the tan delta curve. Tg can also be determined by the inflection of the DSC (Differential Scanning Calorimetry) trace (ASTM Test D3148).

"Melting Temperature" (hereafter identified by its symbol "$T_m$") is the temperature at which the thermal energy in a solid material is sufficient to overcome the intermolecular forces of attraction in the crystalline lattice so that the lattice breaks down and the material becomes a liquid, i.e. it melts. According to the present invention the $T_m$ is measured according to ASTM test D3148.

"Melt Viscosity" is the resistance to shear in a molten resin, quantified as the quotient of shear stress divided by shear rate at any point in the flowing material. Elongational viscosity, which comes into play in the drawing of extrudates, is analogously defined. In polymers, the viscosity depends not only on temperature and, less strongly, on pressure, but also on the level of shear stress (or shear rate). For purposes of the present invention melt viscosity is determined at 380° C. as measured by capillary rheology according to ASTM D3835.

"Moisture Absorption" is the pickup of water vapor by a material upon exposure for a definite time interval in an atmosphere of specified humidity and temperature. No ASTM test exists for this property. Moisture absorption at 50% relative humidity and by immersion in water is measured by weight gain.

"Tensile Modulus" or "Modulus of Elasticity" is the ratio of nominal tensile stress to the corresponding elongation below the proportional limit of the material. The relevant ASTM test is D638.

"Tensile Strength" is the maximum nominal stress sustained by a test specimen being pulled from both ends, at a specified temperature and at a specified rate of stretching. When the maximum nominal stress occurs at the Yield Point it shall be designated tensile strength at yield. When it occurs at break, it shall be designated tensile strength at break. The ASTM test for plastics is D638 (metric, D638M). The SI unit of tensile strength is the pascal ($N/m^2$).

"Organoclay" refers to a nanosilicate (also known as a nanoclay) that has undergone ion exchange to replace metal ions with organic cations. Organoclays as used herein is inclusive of the terms modified organically modified nanoclay, modified nanoclay, modified clay, modified silicate, modified nanosilicate, nanocomposite, and modified nanofiller.

"Modifier" refers to organic cations, including polymer organic cations, that can ion exchange with the metal ions of a nanoclay to form an organoclay.

Gallery spacing or d-spacing is the distance between the various microplates that make up a nanoclay or organoclay. The changes in the gallery spacing appear to be dependent on the composition of the organoclay and the solvent.

"Intercalate" refers to a process by which the d-spacing is increased by the incorporation of a modifier, solvent, or a polymer between the plates. A modified nano clay has a d-spacing that is greater than that for the same unmodified nano clay.

"Exfoliate" refers to the complete separation of the plates that make up the clay structure. Sometimes there is incomplete exfoliation to smaller structures that have multiple plates that are called tactoids.

"Polyamic acid solution" (also known as poly-amide-acid, poly(amic acid), amic acid, polyamicacid, poly(amide acid), poly(amide-acid), or polyamic-acid) is a solution containing amic acid units that have the capability of reacting with surrounding organic moieties to form imide groups.

"Polyimide" as used herein refers to polymers comprising repeating imide functional groups, and optionally additional functional groups such as amides and/or ethers. "Polyimide" accordingly includes within its scope polyamide imides and polyetherimides.

The term "inerted" means that the atmosphere in a container is replaced with an inert gas, such as nitrogen.

"Recycle" means that all or a part of the polymer according to the present invention can be re-used for the original utility for which the polymer was made. For example, if the original use of the polymer as a solvent cast film for a flexible circuit board, all or part of the polymer can be recycled and be re-dissolved in solvent with or without the use of additional monomer or polymer. Recycle can also mean that the polymer can be re-used either in part or completely by another reprocessing method into another utility such as an injected molded part.

When structural units of chemical moieties are said to be formally derived from a precursor moiety herein, there is no implied limitation on the actual chemical reaction that may be used to produce the chemical moiety. For example when a chemical moiety such as a polyetherimide is said to have structural units formally derived from a dianhydride and a diamine, then any known method could be used to prepare the polyetherimide, including reaction of a dianhydride and a diamine, or a displacement reaction between a phenoxide species and an imide bearing a displaceable group, or other known method, it only being necessary that the chemical moiety comprise structural units which may be represented in the stated precursor moiety. In one embodiment, the polymer is a polyimide formed by the polymerization of a dianhydride component and a diamine component and has a Tg of between about 180° C. and 450° C. One article derived from the polymer-organoclay composites is a solvent cast film having: a) a CTE of less than 70 ppm/° C.; b) a thickness of between about 0.1 micrometers and 1000 micrometers; and, c) contains less than 5% residual solvent.

The present invention is directed to articles comprising solvent cast films comprising a dianhydride component and a diamine component and a Tg of between 180° C. and 450° C., specifically 190° C. or greater, and wherein the film has: a) a CTE of less than 70 ppm/° C., specifically less than 60 ppm/° C.; b) a thickness of between 0.1 micrometers and 250 micrometers, e.g., 5 to 250 micrometers; and, c) contains less than 5% residual solvent by weight.

The solvent cast film according to the present invention can be made of at least one polyimide have a Tg of between 180° C. and 450° C. In another embodiment, the polyimide has a Tg of 190° C. or greater, specifically 190° C. to 500° C., more specifically 190° C. to 400° C. The skilled artisan will appreciate that the Tg of any particular polyimide can vary widely depending upon factors including the choice of dianhydride monomer, the number of different dianhydride monomers (structures as opposed to units), the choice of diamine monomer, the number of different diamine monomers (structures as opposed to units), processing conditions during production of the film, type of imidization process used to cure the polymer, etc. The skilled artisan will appreciate the ability to create a polymer having a desired Tg anywhere within the aforementioned range of Tg's, depending on the monomers used, the structure and/or use of endcapping, etc.

The type of polyimide making up the film is similarly variable. The present invention specifically includes random and block polymers and co-polymers in all combinations of the one or more dianhydride and the one or more diamine from which the present polyimides can be made. More than one type of polyimide can be present, for example a combination of a polyamideimide and a polyetherimide, or two different kinds of polyetherimide. Also, the present invention is directed to solvent cast films comprising one or more polyimide films that includes other polymers selected from the group consisting of amorphous thermoplastic polymers including PPSU (polyphenylene sulfone), PSU (polysulfone), PC (polycarbonate), PPO (polyphenylene ether), PMMA (polymethylmethacrylate), ABS (acrylonitrile-butadiene-styrene terpolymer), PS (polystyrene), PVC (polyvinylchloride), crystalline thermoplastic resins including PFA (perfluoroalkoxyalkane), MFA (co-polymer of TFE (tetrafluoroethylene) and PFVE (perfluorinated vinyl ether)), FEP (fluorinated ethylene propylene polymers), PPS (polyphenylene sulfide), PEK (polyether ketone), PEEK (polyether-ether ketone), ECTFE (ethylene-chlorotrifluoroethylene copolymer), PVDF (polyvinylidene fluoride), PTFE (polytetrafluoroethylene), PET (polyethylene terephthalate), POM (polyacetal), PA (polyamide), UHMW-PE (ultra high molecular weight polyethylene), PP (polypropylene), PE (polyethylene), HDPE (high density polyethylene), LDPE (low density polyethylene), and advanced engineering resins such as PBI (polybenzimidazole), poly(ether sulfone), poly (aryl sulfone), polyphenylene ethers, polybenzoxazoles, and polybenzothiazoles, as well as blends and co-polymers thereof.

Measured CTE's of the films may be an inherent property of the material by virtue of the materials chemical make-up. Alternatively, the CTE may be significantly lower than the inherent CTE of the film material through the use of additives and or by the performance of additional processing steps. The CTE of the solvent cast film can be any CTE which is below 70 ppm/° C., specifically below 60 ppm/° C., and allows the film to function in its intended utility. For example, for a flexible circuit board the CTE can be close enough to that of the adjacent metallic conductive layer that the film is capable of serving its intended utility as a dielectric substrate, a layer in a laminate and/or a covering for a flexible circuit board. In separate embodiments, the CTE is less than 70 ppm/° C., less than 50 ppm/° C., less than 40 ppm/° C., less than 35 ppm/° C., less than 30 ppm/° C., or less than 20 ppm/° C. According to other embodiments, the film has a CTE of at least 5 ppm/° C. The film can also have a CTE of 5 ppm/° C. to 60 ppm/° C., and more specifically the coefficient of thermal expansion is 10 ppm/° C. to 30 ppm/° C., and even more specifically 10 ppm/° C. to 20 ppm/° C.

Alternatively, the CTE of the film is adjusted to match a substrate material on which it is disposed. In one embodiment, the film has a CTE that is within ±20 ppm/° C. of the CTE of copper, silicon, aluminum, gold, silver, nickel, a glass, a ceramic, or a polymer, specifically within ±20 ppm/° C. of the CTE of copper, silicon, aluminum, gold, silver, or nickel. In another embodiment, the film has a CTE that is within ±15 ppm/° C. of the coefficient of thermal expansion of copper, silicon, aluminum, gold, silver, or nickel, specifically copper.

In an advantageous feature, it has been found that the CTE of the films is very stable. For example, the film after lamination to a substrate at a temperature from 250 to 450° C. has a CTE within ±10 ppm/° C. of the CTE of the film prior to lamination.

The thickness of the films can vary widely depending upon the end use application, the method of making the film, the solids contents of the casting solution, to name a few of the subject parameters. The thickness may vary from 0.1 micrometers up to 10,000 micrometers, or more particularly from 5 micrometers up to 1,000 micrometers, however it is expected that for use in flexible circuit boards the most likely thickness will be between 0.1 micrometers and 250 micrometers.

The final solvent cast film may contain residual solvent and still be capable of functioning for its intended purpose. The minimum amount of residual solvent will be the most residual solvent content under which the film will still function for its intended utility. One the other hand, the solvent cast films may also contain as low a residual solvent content as is possible to achieve. For example, solvent is expensive and can be an environmental hazard. Both a cost savings and an improvement of environmental conditions may be achieved by minimizing the amounts of solvent contained in final product. The residual solvent content will be less than 5% of the total weight of the film. In another embodiment, the amount of residual solvent will be less than 1% of the total weight of the film.

Solvents that can be used in the process include any solvent with which a solvent cast film may be made. The solvent can be a good solvent for polyimides, by for example, having a relatively high boiling to facilitate solution film formation or direct devolatization via extrusion. The solvent for film formation can be the same that is used to make the polyamic acid solution described below. Examples of suitable solvents include, but are not limited to, N-methyl pyrrolidinone (NMP), trichloroethane, N,N-dimethylacetamide (DMAc), N-methylpyrolidinone (NMP), dimethylsulfoxide (DMSO), sulfolane, tetrahydrofuran (THF), benzophenone, cyclohexanone, phenol, mixtures of o-, p-and m-cresols, mixtures of cresylic with phenol, ethylphenols, isopropylphenols, tert-butylphenols, xylenols, mesitols, chlorophenols, dichlorophenols, ortho-dichlorobenzene (o-DCB), phenylphenols, a monoalkyl ether of ethylene glycol having from 1 to 4 carbon atoms in the alkyl group, a monoalkyl ether of diethylene glycol having from 1 to 4 carbon atoms in the alkyl group, a monoaryl ether glycol, a monoaryl ether of propylene glycol, N,N-dimethylformamide, tetramethylurea, phenoxy ethanol, propylene glycol phenyl ether, anisole, veratrole, o-dichlorobenzene, chlorobenzene, trichlorobenzene, trichloroethane, methylene chloride, chloroform, pyridine, N-cyclohexylpyrrolidinone, ethyl lactate, an ionic liquid, and mixtures containing one or more of these solvents. Ionic liquids generally include salts having a melting point that is relatively low (below 100° C.). Examples of ionic liquids include, but and are not limited to ammonium, imidazolium-, phosphonium-, pyridinium-, pyrrolidinium-, and sulfonium-based salts. Counter-ions in such liquids can include, but are not be limited to the following: bromides, chlorides, tetrafluoroborates, acetates, phosphates, carbonates, sulfates, methane sulfates, nitrates, thiocyanates, and combinations thereof.

The skilled artisan will appreciate that the specific solvent used is dependent on any number of factors including, for example, the solubility of the polyimide and the precursor monomers in a solvent, and the volatility of the solvent, for example.

Solvent cast films according to the present invention may be made by any method known in the art. The following patents assigned to GE disclose generic methods of making solvent cast films and casting solutions: U.S. Pat. Nos. 4,115,341; 4,157,996; 4,307,226; 4,360,633; 4,374,972; and, 3,847,867. One manufacturing process can involve the following steps: forming a polyamic acid solution comprising a monomer component comprising one or more dianhydrides and one or more organic diamines at least partially dissolved in a solvent system; casting the polyamic acid solution onto a substrate such that the polyamic acid solution takes on a form having a length, width and depth on the surface of the substrate; removing the solvent, and curing the polyamic acid solution to form a film having a CTE less than 70 ppm/° C., specifically less than 60 ppm/° C., and a thickness of from 0.1 micrometers to 250 micrometers, specifically 5 to 250 micrometers.

Alternately, the method can comprise making a solvent cast film comprising: preparing a casting solution comprising a polyamic acid solution made up of a monomer component and a solvent component; casting a film of the casting solution on a support base; removing solvent from the cast film for a predetermined period of time to form a solvent cast film having a CTE less than 70 ppm/° C., specifically less than 60 ppm/° C. and a thickness of between 0.1 micrometers and 250 micrometers, specifically between 5 and 250 micrometers; and conducting an additional process step on the solvent cast film to reduce the CTE of the film below 30 ppm/° C.

The polyamic acid solution may be prepared by mixing one or more dianhydride(s), water, and solvent as by stirring until the one or more dianhydride component is dissolved. Then the one or more monomeric diamine can be added and the solution stirred until the amines dissolve. The components that make up the dianhydride component and the diamine component may include 1, 2, 3, 4, 5, or more different dianhydrides and diamines. The scope of the present invention is specifically intended to include all permutations, and combinations of the number and variety of dianhydride and diamine monomers. For example, in one embodiment, the polyamic acid solution will be made up of two different dianhydrides and two different diamines. In another embodiment, one of the one or more dianhydrides is ODPA.

In general, the organic amine component may be included in an amount of from 0.5 mole to 2.0 moles, or, more particularly, from 1 to 1.3 moles, per mole of dianhydride component. Where more than one compound is included in a component of the present solution, the parts, moles, or other quantity of such component is taken as the sum of the parts, moles, or such other quantity, respectively, of each compound included in such component. Thus, for example, total amine content is calculated by adding the equivalent amounts of each diamine in the amine component e.g., 2(number of moles of $1^{st}$ diamine)+2(number of moles of $2^{nd}$ diamine)= total equivalents of amine.

Total anhydride content is calculated in a similar fashion. A slight excess of amine is can be used to impart additional film flexibility or possible cross-linking. It has been found that polyimide enamel can have from 5 to 500 repeating dianhydride-diamine reaction product units and preferably from 10 to 200. Terminal amino and phthalic acid or phthalic anhydride or various suitable end groups can also be present.

Experience has shown that sufficient solvent should be utilized to provide a solids content to provide a solution with a workable viscosity for stirring and handling. In one embodiment, the solids content will be from 1-65% by weight. In other embodiments the solids content will be from 1-40%, 1-25%, 1-15%, or 1-12.5% by weight.

Solutions having high ratios of monomeric reactants to organic solvent component advantageously minimize the amount of organic solvent released during subsequent formation and cure of polyetherimide resins as in the manufacture of solvent cast film. Such solutions having high amounts of monomeric reactants may have higher viscosities than desired for some solvent cast films. Typically, inclusion of water decreases the solution viscosity. A given decrease in viscosity may be effected using a lower amount of added water relative to the amount of added organic solvent component which would be required to effect the same viscosity decrease.

Water may or may not be a part of the polyamic acid solution. Water may be present in any amount up to the maximum amount at which the solution is substantially free of precipitate. Although water is miscible with the organic solvent component in substantially all proportions, inclusion of too much water in the present monomeric solution results in precipitate or other plural phase formation. The amount of water which may be present depends on the particular dianhydride and diamine components, the particular organic solvent component, and the weight ratio of monomeric reactants to organic solvent.

Advantageously, the present polyamic acid solutions may include the monomeric reactants in a combined amount of 40 or more weight percent, e.g. from 40 to 75 or more weight percent, based on the weight of the solution. In general, such high monomer content solutions, including water as may be required, have suitable viscosities in the temperature range, e.g., 15° C. to 200° C., normally used to make solvent cast films.

Solutions including water are more easily prepared by adding the monomeric reactant components with stirring to a solution of the water and organic solvent component. Preparation of the solution is generally accelerated at elevated temperatures.

An additive can present in the polyimide films, for example by adding to the polyamic acid solutions in order to reduce the CTE below the CTE that the material would have without the additive. These additives include those that will aid in lowering the CTE of the solvent cast film, and those that can aid in producing another desirable property in the present films. These ingredients may be used in any amount to impart the desired property at proportions of from 0.001 to 60 parts of additive, per 100 parts by weight of polyimide. Alternatively these additives may be added in amounts from 0.01 to 30 parts of additive, and more particularly from 0.1 to 10 parts of additive per 100 parts by weight of polyimide.

The types of additives which can be employed to lower the CTE of a solvent cast polyimide film include modified nanocomposite silicates (nanoclays). Suitable nanoclays include kaolinite, dickite, nacrite, halloysite, antigorite, chrysotile, pyrophyllite, montmorillonite, beidellite, nontronite, saponite, sauconite, stevensite, hectorite, tetrasilylic mica, sodium taeniolite, muscovite, margarite, talc, vermiculite, phlogopite, xanthophyllite, chlorite, synthetic silicates, and a combination comprising at least one of the foregoing nanoclays.

In a specific embodiment, the present disclosure describes methods of forming nanoclay composites, in particular polymer-organoclay composites, and articles, such as films, comprising the polymer-organoclay composites. The polymer-organoclay composites can be formed into films by solution casting. Such organoclays can be thermally stable at film forming processing temperatures.

Different polymers can be used to form the polymer-organoclay composites, including thermoset and thermoplastic polymers. Exemplary polymers include those described above, specifically polyvinylchlorides, polyolefins, polyesters (including aromatic polyesters), polyamides, polysulfones, polyimides, (including polyamide imides and polyetherimides), polyether sulfone, polyphenylene sulfides, polyether ketones, polyether ether ketones, ABS, polystyrenes, polybutadienes, polyacrylates, polyalkylacrylates, polyacrylonitriles, polyacetals, polycarbonates, polyphenylene ethers, ethylene-vinyl acetate copolymers, polyvinyl acetates, liquid crystalline polymers, ethylene-tetrafluoroethylene copolymers, polyvinyl fluorides, polyvinylidene fluorides, polyvinylidene chlorides, polytetrafluoroethylene, and a combination comprising at least one of the foregoing polymers. A specific polymer is a polyimide.

The polymer-organoclay composites further comprise an organoclay. Organoclays are organically modified nanoclays having a plurality of inorganic silicate layers generally alternating with organic layers. Organoclays can be prepared by ion exchange of metal cations in a nanoclay with organic cations. For example, the sodium ions in montmorillonite nanoclays can be exchanged with an organic cation such as a tetrahydrocarbylammonium or tetrahydrocarbylphosphonium cations. Ion exchange is generally carried out by known methods in water, or a combination of water and a water-miscible organic solvent.

In one embodiment the organic cation is a quaternary organic cation, for example an ammonium or phosphonium ion of formula (1)

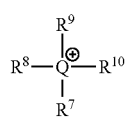

(1)

wherein Q is nitrogen or phosphorous; and $R^7$, $R^8$, $R^9$, and $R^{10}$ are each independently a $C_1$-$C_{20}$ aliphatic radical, a $C_5$-$C_{20}$ cycloaliphatic radical, a $C_2$-$C_{20}$ aromatic radical, or a polymer chain. The foregoing radicals can be unsubstituted or substituted, for example with a $C_1$-$C_{20}$ hydrocarbon and/or one or more functional groups, for example hydroxyl, sulfhydryl, nitro, cyano, halogen, carboxylic acid, carboxylic acid ester, carbonyl, amide, imide, and anhydride.

In another embodiment the organic cation is a quaternary phosphonium cation of formula (2)

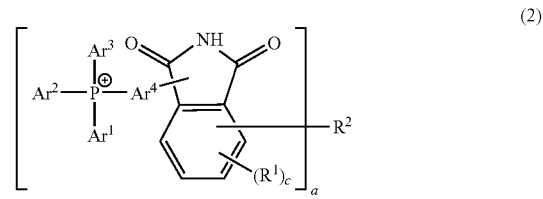

(2)

wherein $Ar^1$, $Ar^2$, $Ar^3$ and $Ar^4$ are each independently $C_6$-$C_{50}$ aromatic radicals; "a" is a number from 1 to about 200; "c" is a number from 0 to 3; $R^1$ is independently at each occurrence a halogen atom, a $C_1$-$C_{20}$ aliphatic radical, a $C_5$-$C_{20}$ cycloaliphatic radical, or a $C_2$-$C_{20}$ aromatic radical; and $R^2$ is a $C_1$-$C_{20}$ aliphatic radical, a $C_5$-$C_{20}$ cycloaliphatic radical, a $C_2$-$C_{50}$ aromatic radical, or a polymer chain.

The organic cation can be a quaternary phosphonium cation of the formula (3)

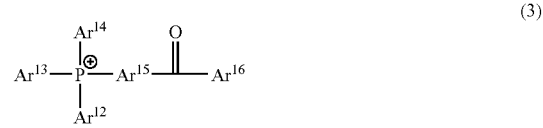

(3)

wherein $Ar^{12}$, $Ar^{13}$, $Ar^{14}$ and $Ar^{15}$ are independently $C_6$-$C_{50}$ aromatic radicals; and $Ar^{16}$ is a $C_2$-$C_{200}$ aromatic radical, or a polymer chain comprising at least one aromatic group.

Exemplary quaternary ammonium cations include a pyridinium cation of formula (4)

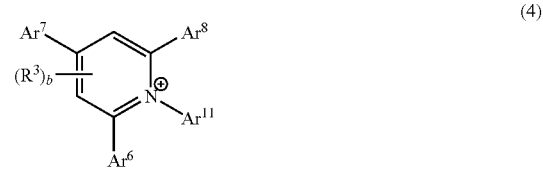

(4)

wherein $Ar^6$, $Ar^7$, and $Ar^8$ are independently $C_6$-$C_{50}$ aromatic radicals; "b" is a number from 0 to 2; $R^3$ is independently at each occurrence a halogen atom, a $C_1$-$C_{20}$ aliphatic radical, a $C_5$-$C_{20}$ cycloaliphatic radical, or a $C_6$-$C_{20}$ aromatic radical; and $Ar^{11}$ is a $C_6$-$C_{200}$ aromatic radical, or a polymer chain comprising at least one aromatic group. A specific example of this type of cation is of formula (5)

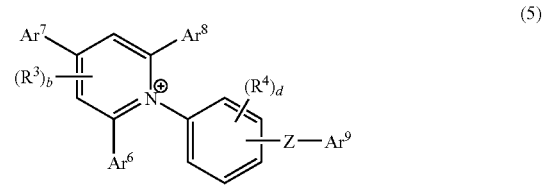

(5)

wherein $Ar^6$, $Ar^7$, and $Ar^8$ are independently $C_2$-$C_{50}$ aromatic radicals; "b" is a number from 0 to 2; "d" is a number from 0 to 4; $R^3$ and $R^4$ are independently at each occurrence a halogen atom, a $C_1$-$C_{20}$ aliphatic radical, a $C_5$-$C_{20}$ cycloaliphatic radical, or a $C_2$-$C_{20}$ aromatic radical; Z is a bond, a divalent $C_1$-$C_{20}$ aliphatic radical, a divalent $C_5$-$C_{20}$ cycloaliphatic radical, a divalent $C_2$-$C_{20}$ aromatic radical, an oxygen linking group, a sulfur linking group, a $SO_2$ linking group, or a Se linking group; and $Ar^9$ is a $C_{10}$-$C_{200}$ aromatic radical, or a polymer chain comprising at least one aromatic group.

After ion exchange, the spacing between the inorganic silicate layers (the "d-spacing") is greater than 15, 20, 25, 30, 40, or 75 Angstroms. The organoclays are then exfoliated to produce the polymer-organoclay composites. Exfoliation occurs when the organoclays are exposed to an energized condition of a sufficient intensity and duration, and results in an increase in the spacing between the inorganic silicate layers (the "d-spacing"). The d-spacing in the exfoliated organoclay can be any distance that is greater than the initial d-spacing, that is, the d-spacing in the non-exfoliated organoclay. In one embodiment, the d-spacing is sufficient to effectively provide a polymer-organoclay composite that will lower the CTE of a polyimide film. In some embodiments, the exfoliated organoclays have in increase in the initial d-spacings of from 5 to 90 Angstroms, in particular greater than 15, 20, 25, 30, 40, or 75 Angstroms. In other embodiments, after the increase, the d-spacing in the exfoliated organoclay is random. When the increase in d-spacing results in a random distribution, the sheets are oriented in such a way that the d-spacing is no longer measurable. In still other embodiments, the net increase in the initial d-spacing of the organoclay is from about 10 to about 500 percent.

One method of exfoliation is sonication. Exfoliation can also be accomplished by high-energy mixing. Both sonication and high-energy mixing are carried out in a solvent system, for example in a system comprising from 1 to 90 wt. % of the organoclay and from 10 to 99 wt. % of the solvent system, specifically 1 to 50 wt. % of the organoclay and from 50 to 99 wt. % of the solvent system, more specifically 1 to 15 wt. % of the organoclay and from 85 to 99 wt. % of the solvent system.

Suitable solvent systems allow good dispersal of the organoclay, effective exfoliation, and also dissolve the polymer or polymer precursor as described below. Suitable solvents include N,N-dimethylacetamide, N,N-dimethylformamide, N-methylpyrolidinone, dimethylsulfoxide, sulfolane, tetrahydrofuran, benzophenone, cyclohexanone, phenol, o-cresol, p-cresol, m-cresol, phenol, ethylphenol, isopropylphenol, t-butylphenol, xylenol, mesitol, chlorophenol, dichlorophenol, phenylphenol, a monoalkyl ether of ethylene glycol having from 1 to about 4 carbon atoms in the alkyl group, a monoalkyl ether of diethylene glycol having from 1 to about 4 carbon atoms in the alkyl group, a monoaryl ether glycol, a monoaryl ether of propylene glycol, tetramethylurea, phenoxy ethanol, propylene glycol phenyl ether, anisole, veratrole, o-dichlorobenzene, chlorobenzene, trichlorobenzene, trichloroethane, methylene chloride, chloroform, pyridine, N-cyclohexylpyrrolidinone, ethyl lactate, an ionic liquid, and a combination thereof.

In one embodiment, a first mixture is formed by combining (e.g., homogenizing) the organoclay in the selected solvent system, followed by exfoliation, i.e., exposing the first mixture to an energized condition to form a second mixture. The energized condition is under sufficient intensity and duration to increase the initial spacing of the inorganic silicate layers, e.g., sonication. Exemplary sonicators are ultrasonic liquid processors available from Misonix, Inc., constant frequency SONOPUSH MONO HD® ultrasonic transducers by Weber Ultrasonics, and tubular submersible transducers sold by MPI. Sonication can be performed in either a batch or continuous process. In the batch process, the homogenized first mixture is placed in contact with the sonic source. The mixture is stirred well to ensure uniform sonication of the entire mixture. In the continuous process, the first mixture is flowed through the sonic zone at a given rate. The mixture is stirred well to ensure a uniform dispersion of the nanosilicate. In either the batch or continuous process, the sonication conditions required for exfoliation (i.e., flow rate, sonication power, sonication time) depends on the type of modifier used, solvent, batch size, configuration and size of the sonic source, and temperature at which sonication takes place. The artisan will appreciate that other equipment and methods can be used to impart energized conditions. In another embodiment, for instance, a SILVERSON™ mixer can be used. Depending on the specific need at hand, different models can be used. Any other functionally equivalent shearer/mixer grinder can be used.

Intercalation and exfoliation of the organoclays can be observed via X-ray diffraction (XRD) of the resulting solution. Exfoliation can also be observed by combining the sonicated organoclay mixture with a polymer, removing the solvent, e.g., by evaporation, precipitation or via a devolatizing extruder, and then casting or pressing a film, and performing TEM analysis.

Exfoliation can be performed before combination with the polymer, after combination with the polymer, before combination with a polymer precursor, or after combination with a polymer precursor. In other words, the polymer or polymer precursor can be added to the first mixture (the solvent and the unexfoliated nanoclay) or to the second mixture (the solvent and the exfoliated nanoclay).

Thus, in a specific embodiment, exfoliation is performed after combination of the unexfoliated nanoclay with a polymer such as a polyimide. In another specific embodiment, exfoliation is performed before combination with a polyimide. In this embodiment, a third mixture is formed by combining the exfoliated nanoclay with the polyimide (or other polymer). The polyimide (or other polymer) can be pre-dissolved in a solvent (e.g., DMAc or NMP) or added directly to the mixture containing the exfoliated organoclay to provide a solids content in the range of 5 to 25 wt. %. The polyimide (or other polymer) is at least partially soluble in the solvent, and further separates the silicate layers in the organoclay. The solvent is then at least partially removed from the third mixture.

Alternatively, exfoliation occurs before combination with a polyamic acid solution (or other polymer precursor) to provide a second mixture having, for example, a solids content from 5 to 25% solids by weight. The polyamic acid solution is then polymerized as described above. In one embodiment, polymerization occurs during removal of the solvent from the exfoliated nanoclay and polyamic acid combination. The thus-formed polyimide is at least partially soluble in the solvent, and further separates the silicate layers in the organoclay. The solvent can then be continued to be removed from the polyimide-organoclay composite. The silicate layers of the organoclay remain separated after solvent removal.

In still another embodiment, a polymer precursor is combined with the unexfoliated organoclay in the solvent system prior to exposing the mixture to an energizing condition. The polymer precursor can be at least partially polymerized before exfoliation, during exfoliation, and/or after exfoliation to provide the polymer. The thus-formed polymer is at least partially soluble in the solvent, and further separates the silicate layers in the organoclay. The solvent is then at least partially removed to provide the polymer-organoclay composite composition. For example, a dianhydride component and an organic diamine component is combined with the organoclay in the solvent system (for example, DMAc), to provide a mixture having a solids content of, e.g., 2 to 15 wt. % solids, or more particularly, 1 to 5 wt. % solids. The organoclay and monomers are sonicated to increase the initial d-spacing of the organoclay. The exfoliated organoclay and monomer mixture is then heated to form a polyamic acid. The thus-formed polyamic acid is at least partially soluble in the solvent. The solvent is then at least partially removed from the second mixture, converting the polyamic acid to the polyimide. It has been found that polymerization of a diamine and dianhydride in the presence of the organoclays results in good dispersion of the organoclays.

In still another embodiment, the organoclay is exfoliated before being combined with a dianhydride component and an organic diamine component in the solvent system (for example, DMAc), to provide a mixture having a solids content of, e.g., 2 to 15 wt. % solids, or more particularly, 1 to 5 wt. % solids. The dianhydride and organic diamine are then polymerized to provide a polyamic acid, and then a polyimide. The thus-formed polyimide is at least partially soluble in the solvent, and further separates the silicate layers in the organoclay. The solvent is then at least partially removed from the polyamic acid or polyimide mixture. The silicate layers of the organoclay remain separated after solvent removal.

Removal of the solvent in any of the foregoing embodiments can be by devolatization or precipitation into nonsolvent. Exfoliation is maintained after removal of the solvent. The resulting polymer-organoclay compositions can be formed into films via solution casting or melt extrusion.

It has been found that use of organoclays, particularly exfoliated organoclays, provides unexpected advantages. Films comprising an organoclay can have a lower CTE than a film of the same composition without the organoclay. Alternatively, or in addition, films comprising an organoclay can have a Tg that is the same as a film of the same composition without the organoclay. A film comprising an organoclay can also be transparent. The amount of organoclay used in the film will vary, depending on the desired film properties. For example, the film can comprise from 0.1 to 10 wt. % of the organoclay, specifically from 1 to 10 wt. % of the organoclay, based on the total weight of the film.

The monomers, at least one dianhydride monomer and at least one diamine monomer, are added to the clay dispersion to form a modified polyamic acid solution. Also, instead of adding polyamic acid to the clay dispersion, in another embodiment, a 10 wt % solution of the dried film in dimethylacetamide or N-methylpyrolidinone has an inherent viscosity of greater than 0.05 dl/g. The polyimide solution can then be combined with the clay dispersion and cast as above.

Another type of additives that can be used to lower the CTE of a solvent cast polyimide film includes soluble nano-particle precursors such as aluminum (acetylacetonate)$_3$.

Another additive that can be employed to lower the CTE of solvent cast polyimide films are metal oxide nanoparticles, which can be formed from an organo-metallic precursor. Metal oxide nanoparticles can be generated in situ by decomposing an organometallic precursor. One example of such a material is aluminum(acetylacetonate)$_3$ (Al(acac)$_3$). Thermolysis of (Al(acac)$_3$) yields aluminum oxide. When done in dilute solution (small molecule solvent or polymer melt) Al$_2$O$_3$ nanoparticles are formed. Targeting a 1% by weight loading of Al$_2$O$_3$ in the final polymer, the precursor can be added upfront to the polymerization of dianhydride and diamine monomers, specifically oxydiphthalic anhydride and diaminodiphenylsulfone. Resultant polymer filled with Al$_2$O$_3$ nanoparticles exhibited a CTE lowered by more than 15% compared to an unfilled control sample.

In addition to the organo-metallic precursor being added to the polymerization, the precursor can be solvent blended with the polyamic acid solution, or finished soluble polyimide, or blended and extruded with finished polymer to yield a filled system. The materials in solution can be cast as films and cured to give the filled film. Other suitable organo-metallic precursors include metal(acac) complexes, and ceramic precursors such as molybdenum sulfide.

Other classes of additives which can be used to impart a desirable property other than, or in addition to lowering the CTE of a polyimide film, include fillers and reinforcements for example fiber glass, milled glass, glass beads, flake and the like. Minerals such as talc, wollastonite, mica, kaolin, or montmorillonite clay, silica, fumed silica, perlite, quartz, and barite may be added. The compositions can also be modified with effective amounts of inorganic fillers, such as, for example, carbon fibers and nanotubes, glass fibers, metal fibers, metal powders, conductive carbon, and other additives including nano-scale reinforcements.

In some cases a metal oxide may be added to the polymers of the present invention. In some instances the metal oxide may further improve flame resistance (FR) performance by decreasing heat release and increasing the time to peak heat release. Titanium dioxide is of note. Other metal oxides include zinc oxides, boron oxides, antimony oxides, iron oxides, and transition metal oxides. Metal oxides that are white may be desired in some instances. Metal oxides may be used alone or in combination with other metal oxides. Metal oxides may be used in any effective amount, in some instances at from 0.01 to 20% by weight of the polymer.

Other useful additives include smoke suppressants such as metal borate salts, for example zinc borate, alkali metal or alkaline earth metal borate or other borate salts. Additionally other boron containing compounds, such as boric acid, borate esters, boron oxides, or other oxygen compounds of boron may be useful. Additionally other flame retardant additives, such as aryl phosphates and brominated aromatic compounds, including polymers containing linkages made from brominated aryl compounds, may be employed. Examples of halogenated aromatic compounds are brominated phenoxy resins, halogenated polystyrenes, halogenated imides, brominated polycarbonates, brominated epoxy resins and mixtures thereof.

In some instances it maybe desired to have flame retardant compositions that are essentially free of halogen atoms, especially bromine and chlorine. Essentially free of halogen atoms means that in some embodiments the composition has less than 3% halogen, specifically chlorine and/or bromine by weight of the composition, and in other embodiments less than 1% by weight of the composition contains halogen atoms, specifically chlorine and/or bromine. The amount of halogen atoms can be determined by ordinary chemical analysis.

The composition may also optionally include a fluoropolymer in an amount of 0.01 to 5.0% fluoropolymer by weight of the composition. The fluoropolymer may be used in any effective amount to provide anti-drip properties to the resin composition. Some examples of suitable fluoropolymers and methods for making such fluoropolymers are set forth, for example, in U.S. Pat. Nos. 3,671,487, 3,723,373 and 3,383, 092. Suitable fluoropolymers include homopolymers and copolymers that comprise structural units derived from one or more fluorinated alpha-olefin monomers. The term "fluorinated alpha-olefin monomer" means an alpha-olefin monomer that includes at least one fluorine atom substituent. Some of the suitable fluorinated alpha-olefin monomers include, for example, fluoroethylenes such as, for example, $CF_2{=}CF_2$, $CHF{=}CF_2$, $CH_2{=}CF_2$, and $CH_2{=}CHF$ and fluoro propylenes such as, for example, $CF_3CF{=}CF_2$, $CF_3CF{=}CHF$, $CF_3CH{=}CF_2$, $CF_3CH{=}CH_2$, $CF_3CF{=}CHF$, $CHF_2CH{=}CHF$, and $CF_3CF{=}CH_2$.

Some of the suitable fluorinated alpha-olefin copolymers include copolymers comprising structural units derived from two or more fluorinated alpha-olefin monomers such as, for example, poly(tetrafluoro ethylene-hexafluoro ethylene), and copolymers comprising structural units derived from one or more fluorinated monomers and one or more non-fluorinated monoethylenically unsaturated monomers that are copolymerizable with the fluorinated monomers such as, for example, poly(tetrafluoroethylene-ethylene-propylene) copolymers. Suitable non-fluorinated monoethylenically unsaturated monomers include for example, alpha-olefin monomers such as, for example, ethylene, propylene, butene, acrylate monomers such as for example, methyl methacrylate, butyl acrylate, and the like, with poly(tetrafluoroethylene) homopolymer (PTFE) preferred.

Other additives which may be added to the solvent cast films include antioxidants such as phosphites, phosphonites, and hindered phenols. Phosphorus containing stabilizers, including triaryl phosphite and aryl phosphonates, are of note as useful additives. Difunctional phosphorus containing compounds can also be employed. Stabilizers with a molecular weight of greater than or equal to 300 Daltons are preferred. In other instances phosphorus containing stabilizers with a molecular weight of greater than or equal to 500 Daltons are useful. Phosphorus containing stabilizers are typically present in the composition at 0.05-0.5% by weight of the formulation. Colorants as well as light stabilizers and UV absorbers may also be used. Flow aids and mold release compounds are also contemplated. Examples of mold release agents are alkyl carboxylic acid esters, for example, pentaerythritol tetrastearate, glycerin tri-stearate, and ethylene glycol distearate. Mold release agents and processing aids are typically present in the composition at 0.05-0.5% by weight of the formulation. Preferred mold release agents will have high molecular weight, typically greater than 300 Daltons, to prevent loss if the release agent from the molten polymer mixture during melt processing.

Compositions used to form the articles according to the present invention may also include various additives such as nucleating, clarifying, stiffness, and/or crystallization rate agents. These agents are used in a conventional matter and in conventional amounts.

The compositions can be blended with the aforementioned ingredients by a variety of methods involving intimate admixing of the materials with any additional additives desired in the formulation. A preferred procedure includes solution blending, although melt blending may be employed after the solvent cast film is made. Illustrative examples of equipment used in such melt processing methods include co-rotating and counter-rotating extruders, single screw extruders, co-kneaders, disc-pack processors, and various other types of extrusion equipment.

Liquid coating solutions can be formed using the above-described polyimide compositions, as well as film-forming solutions. The liquid coating solutions have many and varied uses. The coating solutions can be applied to a variety of substrates using any suitable coating method, e.g. dipping, brushing, spraying, wiping and the like, and thereafter heated to evaporate the solvent system and form cured polyetherimide resinous coatings. The temperature is preferably increased gradually to produce smooth resinous coatings. The polymerization and cure proceeds advantageously at a temperature of from 125° C. to 300° C. or more.

The polyamic acid solution can also be used as a coating solution which may be applied immediately upon preparation or stored prior to use. In general, maximum storage life can be obtained by storing the solutions under a nitrogen blanket in the absence of light.

Polymers used to make the solvent cast films and coatings are polyimides and in some specific instances, polyetherimides. Polyimides according to the present invention have the general formula (6):

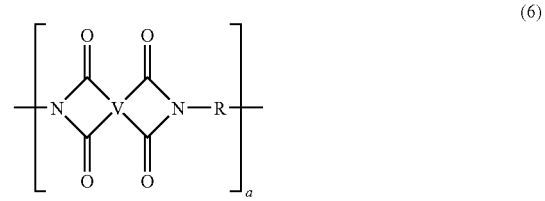

wherein a is more than 1, typically 10 to 1,000 or more, or more specifically 10 to 500; and wherein V is a tetravalent linker without limitation, as long as the linker does not impede synthesis or use of the polyimide. Suitable linkers include but are not limited to: (a) substituted or unsubstituted, saturated, unsaturated or aromatic monocyclic and polycyclic groups having 5 to 50 carbon atoms, (b) substituted or unsubstituted, linear or branched, saturated or unsaturated alkyl groups having 1 to 30 carbon atoms; or combinations comprising at least one of the foregoing. Suitable substitutions and/or linkers include, but are not limited to, ethers, epoxides, amides, esters, and combinations comprising at least one of the foregoing. In one embodiment, at least a portion of the linkers V contain a portion derived from a bisphenol. In another embodiment, none of the linkers V have to contain a portion derived from a bisphenol. Desirably linkers include but are not limited to tetravalent aromatic radicals of the following formulas:

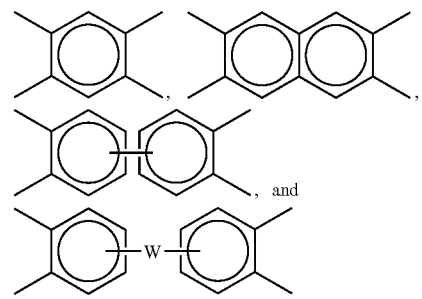

wherein W is a divalent moiety including —O—, —S—, —C(O)—, —SO$_2$—, —SO—, —C$_y$H$_{2y}$— (y being an integer from 1 to 5), and halogenated derivatives thereof, including perfluoroalkylene groups, or a group of the formula —O—Z—O— wherein the divalent bonds of the —O— or the —O—Z—O— group are in the 3,3', 3,4', 4,3', or the 4,4' positions, and wherein Z includes, but is not limited, to divalent radicals of the following formulas:

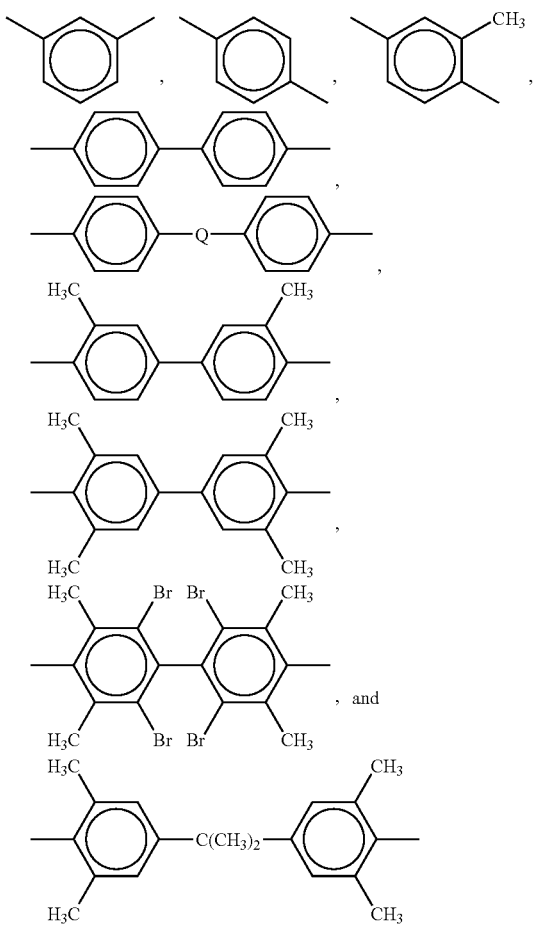

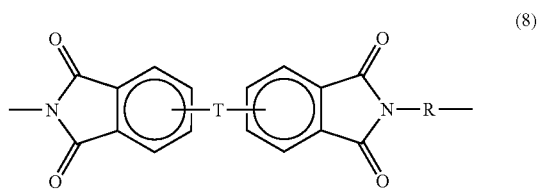

(8)

wherein T is —O— or a group of the formula —O-Z-O— wherein the divalent bonds of the —O— or the —O—Z—O— group are in the 3,3', 3,4', 4,3', or the 4,4' positions, and wherein Z includes, but is not limited, to divalent radicals as described above.

In one embodiment, the polyetherimide may be a copolymer which, in addition to the etherimide units described above, further contains polyimide structural units of the formula (9)

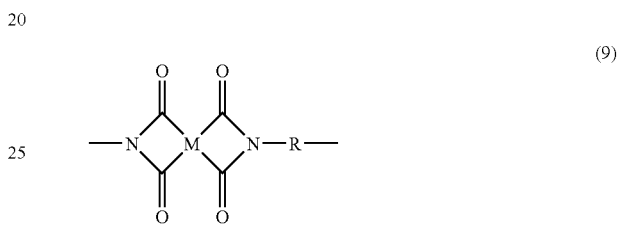

(9)

wherein R is as previously defined for formula (6) and M includes, but is not limited to, the following radicals:

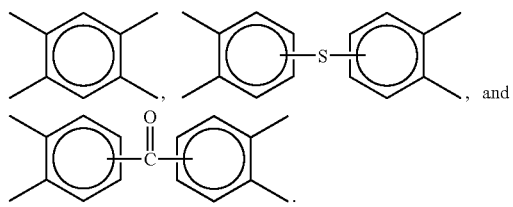

The polyetherimide can be prepared by various methods, including, but not limited to, the reaction of an aromatic bis(ether anhydride) of the formula (10)

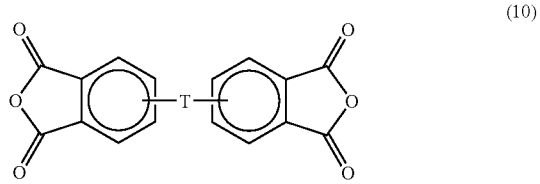

(10)

with an organic diamine of the formula (11)

$H_2N-R-NH_2$ (11)

wherein R and T are defined in relation to formulas (6) and (8).

Examples of specific aromatic bis(ether anhydride)s and organic diamines are disclosed, for example, in U.S. Pat. Nos. 3,972,902 and 4,455,410. Illustrative examples of dianhydride molecules include:

2,2-bis[4-(3,4-dicarboxyphenoxy)phenyl]propane dianhydride;

4,4'-bis(3,4-dicarboxyphenoxy)diphenylether dianhydride;

wherein Q includes but is not limited to a divalent moiety including —O—, —S—, —C(O)—, —SO$_2$—, —SO—, —C$_y$H$_{2y}$— (y being an integer from 1 to 5), and halogenated derivatives thereof, including perfluoroalkylene groups.

R in formula (6) includes but is not limited to substituted or unsubstituted divalent organic radicals such as: (a) aromatic hydrocarbon radicals having 6 to 20 carbon atoms and halogenated derivatives thereof; (b) straight or branched chain alkylene radicals having 2 to 20 carbon atoms; (c) cycloalkylene radicals having 3 to 20 carbon atoms, or (d) divalent radicals of the general formula (7)

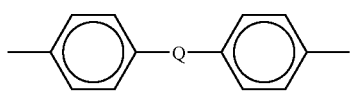

(7)

wherein Q includes but is not limited to a divalent moiety including —O—, —S—, —C(O)—, —SO$_2$—, —SO—, —C$_y$H$_{2y}$— (y being an integer from 1 to 5), and halogenated derivatives thereof, including perfluoroalkylene groups.

Exemplary classes of polyimides include polyamidimides and polyetherimides, particularly those polyetherimides which are melt processable, such as those whose preparation and properties are described in U.S. Pat. Nos. 3,803,085 and 3,905,942.

Exemplary polyetherimide resins comprise more than 1, typically 10 to 1,000, or more specifically, 10 to 500 structural units, of the formula (8)

4,4'-bis(3,4-dicarboxyphenoxy)diphenylsulfide dianhydride;
4,4'-bis(3,4-dicarboxyphenoxy)benzophenone dianhydride;
4,4'-bis(3,4-dicarboxyphenoxy)diphenylsulfone dianhydride;
2,2-bis[4-(2,3-dicarboxyphenoxy)phenyl]propane dianhydride;
4,4'-bis(2,3-dicarboxyphenoxy)diphenylether dianhydride;
4,4'-bis(2,3-dicarboxyphenoxy)diphenylsulfide dianhydride;
4,4'-bis(2,3-dicarboxyphenoxy)benzophenone dianhydride;
4,4'-bis(2,3-dicarboxyphenoxy)diphenylsulfone dianhydride;
4-(2,3-dicarboxyphenoxy)-4'-(3,4-dicarboxyphenoxy) diphenyl-2,2-propane dianhydride;
4-(2,3-dicarboxyphenoxy)-4'-(3,4-dicarboxyphenoxy) diphenylether dianhydride;
4-(2,3-dicarboxyphenoxy)-4'-(3,4-dicarboxyphenoxy) diphenylsulfide dianhydride;
4-(2,3-dicarboxyphenoxy)-4'-(3,4-dicarboxyphenoxy)benzophenone dianhydride;
4-(2,3-dicarboxyphenoxy)-4'-(3,4-dicarboxyphenoxy) diphenylsulfone dianhydride;
1,3-bis(2,3-dicarboxyphenoxy)benzene dianhydride;
1,4-bis(2,3-dicarboxyphenoxy)benzene dianhydride;
1,3-bis(3,4-dicarboxyphenoxy)benzene dianhydride;
1,4-bis(3,4-dicarboxyphenoxy)benzene dianhydride;
3,3',4,4'-diphenyl tetracarboxylic dianhydride;
3,3',4,4'-benzophenonetetracarboxylic dianhydride;
naphthalic dianhydrides, such as 2,3,6,7-naphthalic dianhydride, etc.;
3,3',4,4'-biphenylsulphonictetracarboxylic dianhydride;
3,3',4,4'-biphenylethertetracarboxylic dianhydride;
3,3',4,4'-dimethyldiphenylsilanetetracarboxylic dianhydride;
4,4'-bis (3,4-dicarboxyphenoxy)diphenylsulfide dianhydride;
4,4'-bis (3,4-dicarboxyphenoxy)diphenylsulphone dianhydride;
4,4'-bis (3,4-dicarboxyphenoxy)diphenylpropane dianhydride;
3,3',4,4'-biphenyltetracarboxylic dianhydride;
bis(phthalic)phenylsulphineoxide dianhydride;
p-phenylene-bis(triphenylphthalic)dianhydride;
m-phenylene-bis(triphenylphthalic)dianhydride;
bis(triphenylphthalic)-4,4'-diphenylether dianhydride;
bis(triphenylphthalic)-4,4'-diphenylmethane dianhydride;
2,2'-bis(3,4-dicarboxyphenyl)hexafluoropropane dianhydride;
4,4'-oxydiphthalic dianhydride;
pyromellitic dianhydride;
3,3',4,4'-diphenylsulfonetetracarboxylic dianhydride;
4',4'-bisphenol A dianhydride;
hydroquinone diphthalic dianhydride;
6,6'-bis(3,4-dicarboxyphenoxy)-2,2',3,3'-tetrahydro-3,3,3', 3'-tetramethyl-1,1'-spirobi[1H-indene]dianhydride;
7,7'-bis(3,4-dicarboxyphenoxy)-3,3',4,4'-tetrahydro-4,4,4', 4'-tetramethyl-2,2'-spirobi[2H-1-benzopyran]dianhydride;
1,1'-bis[1-(3,4-dicarboxyphenoxy)-2-methyl-4-phenyl]cyclohexane dianhydride;
3,3',4,4'-diphenylsulfonetetracarboxylic dianhydride;
3,3',4,4'-diphenylsulfidetetracarboxylic dianhydride;
3,3',4,4'-diphenylsulfoxidetetracarboxylic dianhydride;
4,4'-oxydiphthalic dianhydride;
3,4'-oxydiphthalic dianhydride;
3,3'-oxydiphthalic dianhydride;
3,3'-benzophenonetetracarboxylic dianhydride;
4,4'-carbonyldiphthalic dianhydride;
3,3',4,4'-diphenylmethanetetracarboxylic dianhydride;
2,2-bis(4-(3,3-dicarboxyphenyl)propane dianhydride;
2,2-bis(4-(3,3-dicarboxyphenyl)hexafluoropropane dianhydride;
(3,3',4,4'-diphenyl)phenylphosphinetetracarboxylic dianhydride;
(3,3',4,4'-diphenyl)phenylphosphineoxidetetracarboxylic dianhydride;
2,2'-dichloro-3,3',4,4'-biphenyltetracarboxylic dianhydride;
2,2'-dimethyl-3,3',4,4'-biphenyltetracarboxylic dianhydride;
2,2'-dicyano-3,3',4,4'-biphenyltetracarboxylic dianhydride;
2,2'-dibromo-3,3',4,4'-biphenyltetracarboxylic dianhydride;
2,2'-diiodo-3,3',4,4'-biphenyltetracarboxylic dianhydride;
2,2'-ditrifluoromethyl-3,3',4,4'-biphenyltetracarboxylic dianhydride;
2,2'-bis(1-methyl-4-phenyl)-3,3',4,4'-biphenyltetracarboxylic dianhydride;
2,2'-bis(1-trifluoromethyl-2-phenyl)-3,3',4,4'-biphenyltetracarboxylic dianhydride;
2,2'-bis(1-trifluoromethyl-3-phenyl)-3,3',4,4'-biphenyltetracarboxylic dianhydride;
2,2'-bis(1-trifluoromethyl-4-phenyl)-3,3',4,4'-biphenyltetracarboxylic dianhydride;
2,2'-bis(1-phenyl-4-phenyl)-3,3',4,4'-biphenyltetracarboxylic dianhydride;
4,4'-bisphenol A dianhydride;
3,4'-bisphenol A dianhydride;
3,3'-bisphenol A dianhydride;
3,3',4,4'-diphenylsulfoxidetetracarboxylic dianhydride;
4,4'-carbonyldiphthalic dianhydride;
3,3',4,4'-diphenylmethanetetracarboxylic dianhydride;
2,2'-bis(1,3-trifluoromethyl-4-phenyl)-3,3',4,4'-biphenyltetracarboxylic dianhydride, and all isomers thereof, as well as combinations of the foregoing.

The bis(ether anhydride)s can be prepared by the hydrolysis, followed by dehydration, of the reaction product of a nitro substituted phenyl dinitrile with a metal salt of a bisphenol compound (e.g., BPA) in the presence of a dipolar, aprotic solvent. An exemplary class of aromatic bis(ether anhydride)s included by formula (7) above includes, but is not limited to, compounds wherein T is of the formula (12):

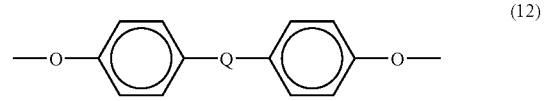

(12)

and the ether linkages, for example, are in the 3,3', 3,4', 4,3', or 4,4' positions, and mixtures comprising at least one of the foregoing, and where Q is as defined above.

Any diamino compound may be employed. Examples of suitable compounds are:
m-phenylenediamine;
p-phenylenediamine;
2,4-diaminotoluene;
2,6-diaminotoluene;
m-xylylenediamine;
p-xylylenediamine;
benzidine;
3,3'-dimethylbenzidine;
3,3'-dimethoxybenzidine;
1,5-diaminonaphthalene;
bis(4-aminophenyl)methane;
bis(4-aminophenyl)propane;
bis(4-aminophenyl)sulfide;

bis(4-aminophenyl)sulfone;
bis(4-aminophenyl)ether;
4,4'-diaminodiphenylpropane;
4,4'-diaminodiphenylmethane(4,4'-methylenedianiline);
4,4'-diaminodiphenylsulfide;
4,4'-diaminodiphenylsulfone;
4,4'-diaminodiphenylether(4,4'-oxydianiline);
1,5-diaminonaphthalene;
3,3'dimethylbenzidine;
3-methylheptamethylenediamine;
4,4-dimethylheptamethylenediamine;
2,2',3,3'-tetrahydro-3,3,3',3'-tetramethyl-1,1'-spirobi[1H-indene]-6,6'-diamine;
3,3',4,4'-tetrahydro-4,4,4',4'-tetramethyl-2,2'-spirobi[2H-1-benzopyran]-7,7'-diamine;
1,1'-bis[1-amino-2-methyl-4-phenyl]cyclohexane, and isomers thereof as well as mixtures and blends comprising at least one of the foregoing.

Desirably, the diamino compounds are aromatic diamines, especially m-and p-phenylenediamine and mixtures comprising at least one of the foregoing.

In one embodiment, the polyetherimide resin comprises structural units according to formula (8) wherein each R is independently p-phenylene or m-phenylene or a mixture comprising at least one of the foregoing and T is a divalent radical of the formula (13)

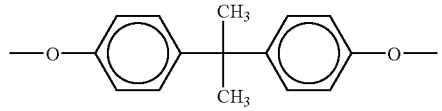
(13)

Included among the many methods of making the polyimides, particularly polyetherimides, are those disclosed in U.S. Pat. Nos. 3,847,867, 3,850,885, 3,852,242, 3,855,178, 3,983,093, and 4,443,591.

The reactions can be carried out employing solvents, e.g., o-dichlorobenzene, m-cresol/toluene and the like, to effect a reaction between the anhydride of formula (10) and the diamine of formula (11), at temperatures of 100° C. to 250° C. Chain stoppers and branching agents may also be employed in the reaction.

When polyimide copolymers of ether-containing and non-ether containing subunits are used, a dianhydride, such as pyromellitic anhydride, is used in combination with the bis (ether anhydride). The polyimides can optionally be prepared from reaction of an aromatic bis(ether anhydride) with an organic diamine in which the diamine is present in the reaction mixture at less than or equal to 0.2 molar excess. Under such conditions the polyetherimide resin may have less than or equal to 15 microequivalents per gram (µeq/g) acid titratable groups, or, more specifically less than or equal to 10 microequivalents/g acid titratable groups, as shown by titration with chloroform solution with a solution of 33 weight percent (wt %) hydrobromic acid in glacial acetic acid. Acid-titratable groups are essentially due to amine end-groups in the polyetherimide resin.

One route for the synthesis of polyimides proceeds through a bis(4-halophthalimide) having the following structure (14):

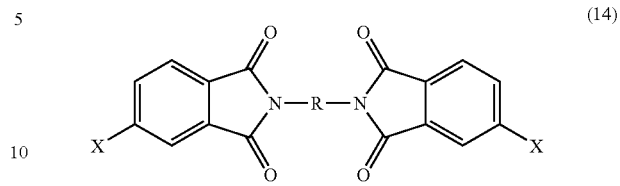
(14)

wherein R is as described above and X is a halogen. The bis(4-halophthalimide) wherein R is a 1,3-phenyl group as shown in formula (15) is particularly useful.

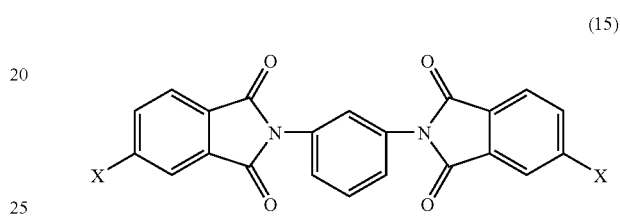
(15)

Bis(halophthalimide)s (14) and (15) are typically formed by the condensation of amines, e.g., 1,3-diaminobenzene with anhydrides, e.g., 4-halophthalic anhydride (16):

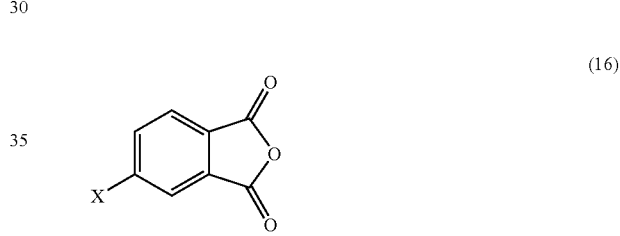
(16)

Polyetherimides may be synthesized by the reaction of the bis(halophthalimide) with an alkali metal salt of a bisphenol such as bisphenol A or a combination of an alkali metal salt of a bisphenol and an alkali metal salt of another dihydroxy substituted aromatic hydrocarbon in the presence or absence of phase transfer catalyst. Suitable phase transfer catalysts are disclosed in U.S. Pat. No. 5,229,482. Suitable dihydroxy substituted aromatic hydrocarbons include those having the formula (17)

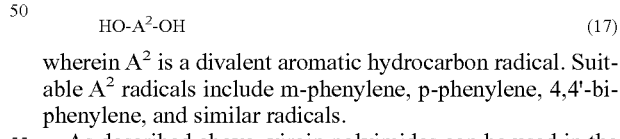
(17)

wherein $A^2$ is a divalent aromatic hydrocarbon radical. Suitable $A^2$ radicals include m-phenylene, p-phenylene, 4,4'-biphenylene, and similar radicals.

As described above, virgin polyimides can be used in the formation of the solvent cast polyimide films. However, in a specific embodiment, the polyimide films comprise up to 50 wt %, specifically up to 30 wt %, of a recycled polyimide, wherein prior to recycling the recycled polyimide film has a glass transition temperature from 210° C. to 450° C. In one embodiment, virgin polyimide is melt blended with recycled polyimide, for example polyimide that has already been formed into a film. In another embodiment, virgin polyimide is solvent mixed with recycled polyimide, for example polyimide that has been formed into a film as described above. Polyimide compositions comprising the recycled polyimide can then be formed into a casting composition and be cast as described herein, for example from a composition comprising 1 to 30 wt % solids. In the foregoing embodiments, the CTE of the film comprising the recycled polyimide can be within ±10 ppm/° C. of a film having the same composition without the recycled polyimide.

As an alternative to creating a solvent cast film having a CTE less than 70 ppm/° C., in another embodiment less than 60 ppm/° C., or in another embodiment, less than 35 ppm/° C., it is possible to add an additional process step to lower the CTE of a solvent cast film having a CTE above 70 ppm/° C., above 60 ppm/° C., or in another embodiment, above 35 ppm/° C., to a CTE below 60 ppm/° C. and in another embodiment less than 35 ppm/° C., specifically less than 30 ppm/° C.

The CTE of a solvent cast film can be reduced by biaxially stretching as described in U.S. Pat. No. 5,460,890. Similarly, the CTE of a melt extruded film or fully imidized solvent cast film can be reduced by thermally biaxially stretching as described in U.S. Pat. No. 5,260,407. The skilled artisan will be familiar with the other known methods of lowering the CTE of a polyimide film.

For example, a film with a low in-plane CTE maybe obtained from polyimide resin compositions because the resin exhibits a partial crystallinity after annealing, and the crystalline phases can be aligned in two dimensions through biaxial stretching after extrusion. The film can then be heat set while constrained in a frame, returning the amorphous portion of the film back to a random unoriented configuration while retaining the alignment of the crystalline phases (and also inducing more aligned crystalline domains). The alignment of the crystalline phases results in a film with a low CTE. Since the amorphous part of the material is returned to its random state the film will not exhibit shrinkage, even when taken above the Tg of the material. This can lead to a dimensionally stable film at flex fabrication temperatures, because the crystalline domains are stable to temperatures above 400° C. The film has high temperature survivability due to the high Tg of the material and the partial crystallinity. The Tg of the material is above the temperature of the solder float test, which makes the material survive this test as well. The polymer crystals do not melt until temperatures exceeding 400° C., which is well above the temperatures seen during flex fabrication. The crystals act as effective crosslinks below Tm, holding the material together for high temperature survivability. The crystallization kinetics of the composition identified below is fairly slow, allowing the material to be melt extruded to a film before significant crystallization takes place. The film can then be heat set above Tg to induce crystallinity.

A wide range of polyetherimide copolymers containing a combination of the monomers 4,4'-oxydiphthalic anhydride (ODPA), bisphenol A dianhydride (BPADA), meta-phenylenediamine (mPD), and para-phenylenediamine (pPD) exhibit the partial crystallinity and high heat necessary for the film to exhibit the desired properties. The polymer can be end capped with, for example, aniline. The scope of the present invention is specifically intended to encompass the monomers and endcaps necessary to have partial crystallinity and to maintain processability. A specific example can be 80-100% ODPA as the dianhydride and 30-100% pPD as the diamine, with 3.5-5% aniline as the endcapping agent.

Varying these compositions can alter the crystallization kinetics to achieve the desired balance of processability and achievable crystallinity to reduce CTE. In one embodiment, the optimum composition in terms of processability, ductility, slow crystallization kinetics, and maximum achievable crystallinity is a dianhydride component comprising 95% ODPA and 5% BPADA, on an equivalents basis, and a diamine component comprising 70% mPD and 30% pPD on an equivalents basis, together with 5% aniline, based on the total equivalents of dianhydride component and diamine component.

Very good film properties are obtained when a specific combination of dianhydrides are used, especially when the specific dianhydrides are used in combination with specific diamines. In one embodiment, the dianhydrides comprise 3,4'-oxydiphthalic anhydride, 3,3'-oxydiphthalic anhydride, 4,4'-oxydiphthalic anhydride, and combinations thereof. Other, additional dianhydrides can be present to adjust the properties of the films. In one embodiment, however, the polyimide has less than 15 molar % of structural units derived from a member of the group consisting of biphenyltetracarboxylic acid, a dianhydride of biphenyltetracarboxylic acid, an ester of biphenyltetracarboxylic acid, and combinations thereof.

Alternatively, the polyimides are formed from a dianhydride component that consists essentially of 3,4'-oxydiphthalic anhydride, 3,3'-oxydiphthalic anhydride, 4,4'-oxydiphthalic anhydride, and combinations thereof. In still another embodiment, the polyimides are formed from a dianhydride component that consists of 3,4'-oxydiphthalic anhydride, 3,3'-oxydiphthalic anhydride, 4,4'-oxydiphthalic anhydride, and combinations thereof.

It has further been found films having excellent properties are obtained when the diamine component comprises 4,4'-diaminodiphenyl sulfone, m-phenylenediamine, p-phenylenediamine, 4,4'-oxydianiline, 1,3-bis(4-aminophenoxy)benzene, 1,3-bis(3-aminophenoxy)benzene, and combinations thereof. In one embodiment, the diamine component consists essentially of 4,4'-diaminodiphenyl sulfone, m-phenylenediamine, p-phenylenediamine, 4,4'-oxydianiline, 1,3-bis(4-aminophenoxy)benzene, 1,3-bis(3-aminophenoxy)benzene, and combinations thereof. In another embodiment, the diamine component consists of 4,4'-diaminodiphenyl sulfone, m-phenylenediamine, p-phenylenediamine, 4,4'-oxydianiline, 1,3-bis(4-aminophenoxy)benzene, 1,3-bis(3-aminophenoxy)benzene, and combinations thereof, and no other diamines are present.

The polyimides are further advantageously formed from structural units wherein the diamine component comprises greater than or equal to 10 mole % of 4,4'-diaminodiphenyl sulfone, based on the total moles of diamine component. In one embodiment the diamine component comprises 10 to 100 mole % of 4,4'-diaminodiphenyl sulfone.

The films can have a number of advantageous properties, in addition to low CTE, useful Tg, and low solvent retention. In one embodiment, the film is stable, that is, loses less than 5% of its initial weight after storage in water for 24 hours at 25° C., specifically less than 2% of its initial weight after storage in water for 24 hours at 25° C.

In an unexpected feature, it has been found by the inventors that the polyimides, in particular polyetherimides comprising units derived from specific diamines, can be formulated to exhibit a relatively constant CTE while achieved a Tg from 220 to 375° C. This result is unexpected because ordinarily in thermoplastic amorphous films, CTE varies with Tg of in a linear relationship. It is therefore possible to select a desired Tg while maintaining a specific CTE.

The liquid coating solutions, film casting solutions, coatings, and solvent cast films of the present invention have many and varied uses. The coating solutions may be applied to a variety of substrates using any suitable coating method, e.g. dipping, brushing, spraying, wiping and the like, and thereafter heated to evaporate the solvent system and form cured polyimide resinous coatings and/or solvent cast films. The temperature is preferably increased gradually to produce smooth resinous coatings. The polyimide-forming reaction proceeds advantageously at a temperature of from 125° C. to 450° C. or more. A variety of substrates can be used, for example copper, silicon, aluminum, gold, silver, nickel, a glass, a ceramic, and a polymer, including a polymeric release layer. A first and a second substrate having the same or different compositions can be disposed on opposite sides of the solvent cast polyimide film.

In one embodiment, the coating and casting solutions are used to manufacture a laminate comprising the solvent cast polyimide film, a conductive layer comprising a metal, wherein a side of the film is adheringly disposed on a side of the conductive layer. The conductive metal can be copper, silver, gold, aluminum, or an alloy comprising at least one of the foregoing metals. In a specific embodiment, the metal is copper and wherein the solvent cast film has a coefficient of thermal expansion less than 35 ppm/° C.

In another embodiment, the present coating and casting solutions may be employed to manufacture films for circuit boards, including flexible circuit boards. In this embodiment, a solvent cast polyimide film is adheringly disposed on an electrically conductive substrate, for example a face of a metal layer such as copper, wherein the metal is etched to provide a circuit. A second substrate, e.g., another layer of a conductive metal such as copper, silicon, aluminum, gold, silver, or nickel, can be disposed on a side of the film opposite the first substrate. The flexible printed circuit can further comprise a dielectric layer comprising a second dielectric material other than the polyimide of the film.

Other specific articles that can be manufactured using the solvent cast polyimide films include capacitors, which in their simplest embodiment comprise a solvent cast polyimide film disposed between two electrically conductive layers, e.g., two copper layers.

In still another embodiment, the solutions can be used as wire enamels to form resinous insulating coatings on copper and aluminum wire. In this embodiment, the polyimide film forms a coating on an electrically conductive wire that surrounds at least a portion of the radial surface of the wire.

The solutions can also be used as varnishes for coating or impregnating various substrates such as coils of previously insulated wire (e.g. in motor and generator coils), as well as woven and non-woven fabrics, and the like. The solvent cast films of the present invention may also be used for flexible printed circuit board (FPC), chip-on-flex (COF), and tape automated bonding (TAB) applications. The term "articles" can also include speaker cones, tapes and labels, wire wraps, etc.

EXAMPLES

Without further elaboration, it is believed that the skilled artisan can, using the description herein, make and use the present invention. The following examples are included to provide additional guidance to those skilled in the art of practicing the claimed invention. These examples are provided as representative of the work and contribute to the teaching of the present invention. Accordingly, these examples are not intended to limit the scope of the present invention in any way. Unless otherwise specified below, all parts are by weight and all temperatures are in degrees Celsius.

Materials

ODPA is a dianhydride monomer also known as 4,4'-oxydiphthalic anhydride (CAS No. 1823-59-2) which can be made as described in U.S. Pat. No. 6,028,203, U.S. Pat. No. 4,870,194, or U.S. Pat. No. 5,021,168. ODPA (99% purity) was from Chriskev Company, Lenexa, Kans., USA.

BPDA is a dianhydride monomer also known as 3,3',4,4'-biphenyltetracarboxylic dianhydride, which is commercially available from Chriskev Company, with offices in Leawood, Kans.

PMDA is a dianhydride monomer also known as pyromellitic dianhydride, which is commercially available from Aldrich Chemical Company, with offices in Milwaukee, Wis.

BPADA is a dianhydride monomer also known as 2,2-bis [4-(3,4-dicarboxyphenoxy)phenyl]propane dianhydride, which is commercially available from Aldrich Chemical Company, with offices in Milwaukee, Wis.

BTDA is a dianhydride monomer also known as 3,3'-benzophenonetetracarboxylic dianhydride which is commercially available from TCI America, with offices in Portland, Oreg.

BPhDA is a dianhydride monomer also known as 4,4'-bis (3,4-dicarboxyphenoxy)biphenyl dianhydride which can be made as described in the *Journal of Polymer Science, Polymer Chemistry Edition*, 1985, Vol. 23(6), pp. 1759-1769.

DDS is a diamine monomer also known as 4,4'-diamino diphenyl sulfone, which is commercially available from Chriskev Company, with offices in Leawood, Kans.

MPD is a diamine monomer also known as meta-phenylenediamine, which is commercially available from Aldrich Chemical Company, with offices in Milwaukee, Wis.

PPD is a diamine monomer also known as para-phenylenediamine, which is commercially available from Aldrich Chemical Company, with offices in Milwaukee, Wis.

ODA is a diamine monomer also known as 4,4'-oxydianiline, which is commercially available from Chriskev Company, with offices in Leawood, Kans.

1,3,4-APB is a diamine monomer also known as 1,3-bis(4-aminophenoxy)benzene, which is commercially available from Chriskev Company, with offices in Leawood, Kans.

1,3,3-APB is a diamine monomer also known as 1,3-bis(3-aminophenoxy)benzene, which is commercially available from Chriskev Company, with offices in Leawood, Kans.

TPPBr is a phosphonium salt also known as tetraphenylphosphonium bromide, which is commercially available from Fluorochem Ltd., with offices in Old Glossop, United Kingdom.

Sodium montmorillonite is an inorganic layered silicate, which is commercially available from Sud-Chemie, with offices in Dusseldorf, Germany.

Bisphenol A dianhydride (BPADA) (97.7% purity) was obtained from GE Plastics.

2,4,6-Triphenyl-pyrylium tetrafluoroborate, aniline, 4-phenoxyaniline, 4-cumylphenol, potassium carbonate, 1-fluoro-4-nitro-benzene, palladium on carbon, and ammonium formate were procured from Aldrich.

The examples were performed with the following terms being defined:

DSC: Differential Scanning Calorimetry was conducted on a Perkin Elmer DSC 7 with a heating rate of 20° C./min and the glass transition measured in the second heat. This method is based upon ASTM D3418.

DMA: Film samples cut precisely to give known length width and thickness were analyzed on a dynamic mechanical analyzer in a tensile mode with a frequency of 1 Hz and heating rate of 5° C./min over the temperature range 40-350° C. Dynamic mechanical analysis (DMA) is conducted in accordance to ASTM test D5026, with the exception that only one test specimen is tested. The glass transition temperature (Tg) is determined by the maximum point of the tan delta curve.

TMA: CTE values of the cast films were measured on a thermo-mechanical analyzer with a heating rate of 5° C./min from 0-250° C. CTE values were calculated from the slope over the range of 30-200° C.

Equilibrium water: The equilibrium water content was defined as the moisture content of films allowed to stand at ambient conditions in the lab for 72 h (about 25° C. and 70% RH). The moisture content was measured by accurately weighing a sample of film 10.2 centimeters×1.27 centimeters×63.5 micrometers (about 4 inch×0.5 inch×0.0025 inch) before and after a drying. Films were weighed (to 0.00005 g), dried in a 150° C. oven for 4 h, and then immediately weighed to determine the moisture loss. Equilibrium water content is the mass lost upon heating divided by the mass of the dried film as a percent.

Moisture absorption: Dried film samples (oven at 150° C. for 4 h) of known mass were submerged in water for 72 h at ambient temperature (25° C.). Following the time period, the films were removed from the water and the excess moisture removed by drying with a Kimwipe. Moisture absorption is the mass uptake upon soaking in water divided by the weight of the dried film as a percent.

Solubility: A positive result indicates that at a concentration of 10% solids, the fully imidized film cast from the poly(amic acid) solution dissolves in dimethylacetamide or N-methylpyrolidinone (solvent indicated in the test) and can pass through a 0.45 micrometer filter.

off, and the solid modified clay was washed by redispersing the clay in deionized water or deionized water solvent combination and recollected by centrifugation. The wash solution was poured off and the wash process was repeated twice more. Following the final centrifugation, the solid clay was dried in an oven and then ground to a fine powder.

Example 1

Part B

Detailed example: 2.0 g of Na$^+$ MMT clay (cation exchange capacity of 0.000926 mols Na$^+$/g of clay; 0.001852 mols of cations total) was dispersed in 200 mL of a 50/50 mixture of deionized water and ethanol and brought to reflux. Tetraphenylphosphonium bromide (1.4167 g, 0.002216 mols) was added and the dispersion was allowed to stir at reflux for two hours. The mixture was cooled to room temperature and transferred to four 50 mL centrifuge tubes. The tubes were placed on a centrifuge and spun at 3000 rpm for 5 min. The supernatant was poured off, the clay was redispersed in a fresh mixture of 50/50 deionized water and ethanol to wash the remaining solid, and solid was again collected again by centrifugation. The wash procedure was repeated twice more. Following the final centrifugation and decantation the remaining solid was dried in a 120° C. oven for two hours and then ground to a fine powder. Table 1 shows the properties of organic modified montmorillonite organoclay.

TABLE 1

| Modifier | d-Spacing (Angstroms) | MW of modifier | Wt. loss on TGA under N$_2$ at 900° C. (%) | TGA 5% loss under N$_2$ (° C.) | Wt loss at 400° C. under N$_2$ for 30 min (%) |
|---|---|---|---|---|---|
| TPP | 17.8 | 339.4 | 25.0 | 449.0 | 3.1 |

Example 1

Part A

Procedure for the Preparation of an Organically Modified Clay (Organoclay)

The organically modified clay was prepared via ion exchange in water or a combination of water and an alcohol, or water and acetonitrile. The Na$^+$ MMT (a clay with sodium counter ions) was dispersed in water or in the water/solvent combination at a concentration of 1 to 5% by weight of the nanoclay, and heated to 80° C. The organic cation, tetraphenylphosphonium bromide, was dissolved or dispersed water or solvent combination as above in a ratio such that when the solution or dispersion of the organic cation was added to the clay dispersion there were organic cations equal to or in excess of the cation ion exchange capacity of the dispersed clay. The mixture was then heated to reflux for 1 to 2 hours. Following cooling to room temperature, the modified clay was collected by centrifugation. The supernatant was poured Example 2

Solvent Cast Film Comprising Polyimide-organoclay Composite

Tetraphenylphosphonium treated montmorillonite clay from Example 1 (TPP-MMT) was dispersed in NMP with the aid of sonication. Oxydianiline (ODA) was added to the resulting solution and mechanically stirred until the diamine was completely dissolved at room temperature. Oxydiphthalic dianhydride (ODPA) was then added to the solution and dispersed with mechanical stirring to form a viscous poly (amic acid) solution at 20 wt % solids. The solution was allowed to react at room temperature for 12 hours. The solution was cast onto a glass substrate at 70° C. and imidized by successive heating at 70° C. for 2 hours, 150° C. for 4 hours, 200° C. for 1 hour and 300° C. for 1 hour. The resulting nano filled polyimide film was peeled from the glass substrate for testing. Results are shown in Table 2.

TABLE 2

| Ex. No. | Polymer | Nanoclay | Wt. % Silicate | CTE (ppm/° C.) 2nd scan (0-200) | % CTE Reduction (2nd scan) | Normalized % CTE Reduction (2nd scan) |
|---|---|---|---|---|---|---|
| 2A | 44ODPA-44ODA | None | 0 | 44.0 | 0% | |
| 2B | 44ODPA-44ODA | Yes | 3.8 | 39.4 | 11% | 2.8% |
| 2C | 44ODPA-44ODA | Yes | 7.5 | 37.2 | 15% | 2.1% |
| 2D | 44ODPA-44ODA | Yes | 15.0 | 30.9 | 30% | 2.0% |

Example 3

Preparation of (3-Aminophenyl)triphenylphosphonium Iodide (18)

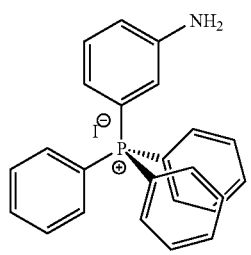

(18)

To a 3000 mL 3-necked round-bottomed flask fitted with a condenser, mechanical stirrer and gas inlet, about 329.33 g (1.25 mol) of triphenylphosphine ($PPh_3$), Pd(acetate)2 (2.82 g, 0.0126 mol) and 1600 mL of de-gassed xylene was added. The mixture was stirred under argon until the $PPh_3$ is dissolved. m-Iodoaniline (about 275.00 g; 1.25 mol) was added and the yellow-orange solution was refluxed for around 80 minutes. The product phosphonium compound ((3-aminophenyl)triphenylphosphonium Iodide) separated from solution as a yellow-orange solid. Excessive refluxing was avoided to prevent discoloration of the product phosphonium compound. The progress of the reaction was monitored using thin layer chromatography (TLC) with a 50/50 hexane/ethyl acetate developing solution. After the reflux, the product was filtered. The product 15 was reslurried with hot toluene, and stirred for 15 minutes. The solution was then filtered and rinsed with additional toluene/xylene. After drying in a 150° C. vacuum oven for 20 hours, 585.01 g of off-white product was obtained in a 96% yield. The melting point and NMR data are consistent with the structure of product (15). MP: 316.0° C. 1H NMR ($\delta$, D6-DMSO): 8-6.6 (m, 19H, aromatics), 5.88 (s, 2H).

Example 4

Preparation of 4-(4-Cumyl)-phenoxy-phthalonitrile (19)

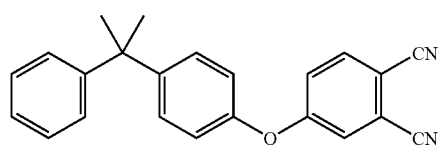

(19)

A 3 liter flask was charged with 4-cumylphenol (170.9 g, 0.80 mole), 4-nitrophthalonitrile (150 g, 0.87 mole), potassium carbonate (155.8 g, 1.13 mole), and dimethylforamide (1.4 L). The solution was heated under nitrogen with stirring to about 90° C. for about 100 minutes. The progress of reaction was monitored by thin layer chromatography. The dark brown reaction mixture was cooled and 2M HCl solution (600 mL) was added with stirring. The organic layer was extracted with chloroform (3×300 mL). The chloroform layer was separated, and washed with water (3×100 mL), and dried ($MgSO_4$). The mixture was filtered and the solvent was evaporated on a hot oil bath at a temperature of greater than about 100° C. to afford crude nitrile (15) as viscous green oil (278 g, 84% yield). $^1$H NMR ($\delta$, D6-DMSO): 8.09 (d, 1H), 7.78 (d, 1H), 7.40-7.15 (m, 8H), 7.10 (d, 2H), 1.66 (s, 6H, Me).

Example 5

Preparation of 4-(4-Cumyl)phenoxy-phthalic anhydride (20)

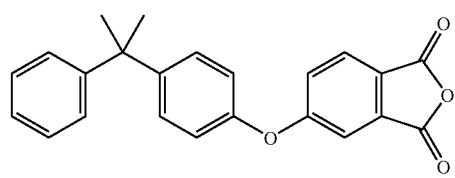

(20)

A 3L 3-necked round-bottomed flask was equipped with a condenser, mechanical stirrer, and an addition funnel. The flask was charged with 4-(4-cumylphenoxy)-phthalonitrile (278 g, 0.82 mole) and acetic acid (1.6 L). The addition funnel was filled with 70% sulfuric acid (670 mL). The solution was heated to 120° C., and then sulfuric was added drop-wise into the reaction mixture over 2 hours. The resulting mixture was refluxed overnight (12 hours). The reaction mixture was cooled to room temperature, and poured into an ice-water mixture (about 1 kg). The product was extracted with ethyl acetate (3×300 mL). The ethyl acetate layer was isolated and dried with anhydrous $MgSO_4$. The solution was filtered to remove the $MgSO_4$ and the solvent was removed on a rotary evaporator. The resulting brown liquid was dried in a vacuum oven at 160° C. overnight. This yielded the desired anhydride (17) as viscous brown oil (276 g, 94% yield). $^1$H-NMR ($\delta$, D6-DMSO): 7.96 (d, 1H), 7.50-7.20 (m, 9H), 7.03 (d, 2H), 1.76 (s, 6H, Me).

Example 6

Synthesis of CumylPA-mATPP-I (21)

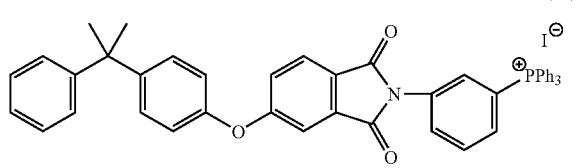

(21)

A 500 mL glass reaction vessel fitted with a mechanical stirrer, nitrogen inlet and gas outlet was charged with 66.27 g (0.1848 mol) 4-(4-cumyl)phenoxy-phthalic anhydride and 88.97 g (0.1848 mol) 3-aminophenyl)triphenylphosphonium Iodide (mATPP iodide). The vessel was then placed in a heating mantle enclosure and heated to about 300° C. to produce a molten reaction mixture. After stirring for about three minutes, vacuum was applied to remove water formed as a byproduct. After about 15 minutes total reaction time, the reaction mixture was poured into a Teflon tray and cooled to provide compound (18) (145.19 g, 95.6%) as a smooth brown glass. 1H NMR (δ, D6-DMSO): 8.07-7.08 (31H, aromatic), 1.68 (s, 6H).

Example 6A

Alternate One-Pot Synthesis of CumylPA-mATPP-I (18)

The reagents, m-aminotetraphenylphosphonium iodide, 22.14 g (0.046 mol), and 4-chlorophthalic anhydride, 8.40 g (0.046) were weighed out and added to a 250 ml round bottom flask equipped with a Dean-Stark condenser and dissolved in 150 mL of o-dichlorobenzene. The contents were heated to reflux and the water was removed by azeotropic distillation and a nitrogen purge. After 4 h at reflux, 10.78 g of sodium cumylphenolate (0.046 mol) was added and the contents stirred and heated for an additional 4 h. After cooling to room temperature, the solution was poured into 400 mL of ethyl ether and the resulting solid was collected by vacuum filtration. The solid was redissolved in 100 mL of chloroform and the resulting solution poured into 300 mL of ethyl ether. The resulting solid was collected by vacuum filtration and dried under vacuum overnight. $^{13}$C-NMR was consistent with the structure. Overall yield: about 60%.

Example 7

Synthesis of BPADAPA-mATPP-I (22)

About 58.0 g (0.1114 mol) of bisphenol A dianhydride (BPADA) and 107.27 g (0.2229 mol) 3-aminophenyl)triphenylphosphonium Iodide (mATPP-I) 1 were shaken together. The dry mixture was then added to a glass reaction flask using a long paper funnel to prevent the reagents from sticking to the upper inside of the flask. The reaction flask was evacuated and backfilled with nitrogen twice. The external heater was turned on and set to about 300° C. As the reagents melted, a brown solution formed. After the reagents had been melted for 3-5 minutes, the reaction flask was evacuated to remove water. The pressure was initially set to 600 milibar (mb) and successively lowered to 10 mb. When the reaction was complete, the pressure was set back to 1000 mb and the stirrer was turned off. The productdiphosphonium bisimide (19) was cooled to yield 158.48 g (98.28%) of a brown glass. 1H NMR (δ, D6-DMSO): 8.1-7.1 (m, 52H, aromatics), 1.73 (s, 6H).

Example 8

Synthesis of 4-(4-Phenylphenoxy)-phthalonitrile

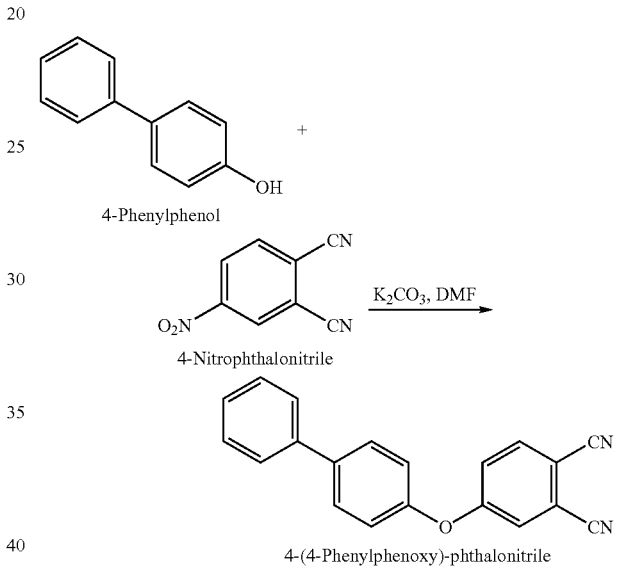

A 1 L round 3-necked round-bottomed flask was charged with 4-phenylphenol (45.7 g, 0.27 mole), 4-nitrophthalonitrile (50 g, 0.29 mole), potassium carbonate (51.9 g, 0.38 mole), and dimethylformide (470 mL). The resulting solution was heated under nitrogen with stirring to 90° C. for 1.5 hour (progress of reaction can be monitored by TLC). The dark brown reaction mixture was then poured into 2M aqueous HCl solution (300 mL) with stirring. The product precipitated out as a pale brown powder. The powder was collected by filtration and dried in a vacuum oven at 150° C. to give the desired product (71 g, 94% yield). $^1$H NMR (δ, D6-DMSO): 8.13 (d, 1H), 7.87 (d, 1H), 7.80 (d, 2H), 7.70 (d, 2H), 7.55-7.35 (m, 4H), 7.30 (d, 2H).

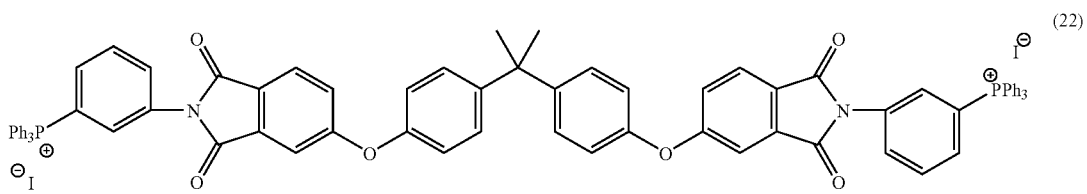

(22)

Synthesis of 4-(4-Phenylphenoxy)-phthalic anhydride

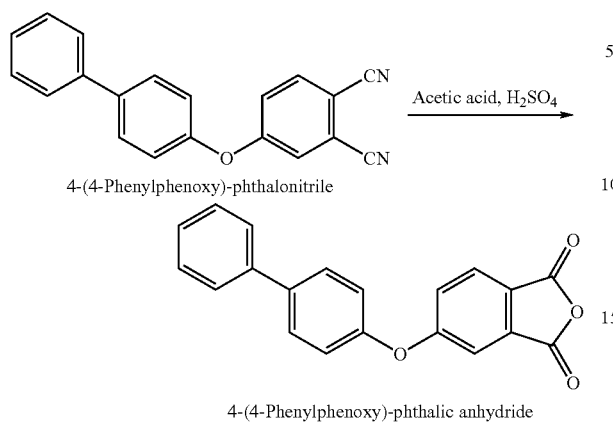

4-(4-Phenylphenoxy)-phthalonitrile 4-(4-Phenylphenoxy)-phthalic anhydride

A 1 L 3-necked round-bottomed flask was equipped with a condenser, mechanical stirrer, and an addition funnel. The flask was charged with 4-(4-phenylphenoxy)-phthalonitrile (71 g, 0.24 mole) and acetic acid (450 mL). The addition funnel was filled with 70% sulfuric acid (200 mL). The solution was heated to 120° C., and then sulfuric was added drop-wise into the reaction mixture over 2 hours. The resulting mixture was refluxed overnight (12 hours). The reaction mixture was cooled to room temperature, and poured into an ice-water mixture (~1 kg). The product precipitated out as a pale brown powder. The powder was collected by filtration, and it was further purified by recrystallization using acetic anhydride (255 mL). The crystal was collected by filtration and dried in a vacuum oven at 150° C. overnight to give the desired product (75.0 g, 99% yield). MP 199° C. $^1$H NMR (δ, D6-DMSO): 8.11 (d, 1H), 7.82 (d, 2H), 7.71 (d, 2H), 7.58 (dd, 1H), 7.55-7.35 (m, 4H), 7.30 (d, 2H).

Synthesis of BiphenylPA-mATPP-I Modifier

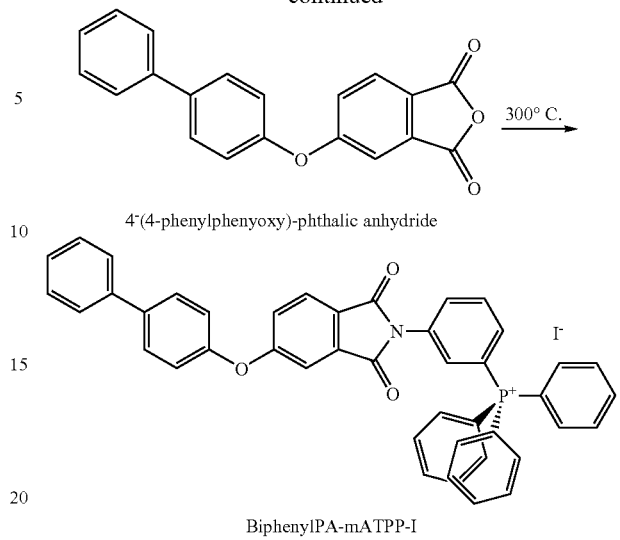

mATPP-I

4'-(4-phenylphenyoxy)-phthalic anhydride

BiphenylPA-mATPP-I

A 250 mL glass reaction vessel was fitted with a mechanical stirrer, nitrogen inlet and gas outlet. To it were added 4-(4-phenylphenyoxy)-phthalic anhydride (15.8 g, 0.050 mol) and mATPP-I (24.0 g, 0.050 mol). The vessel was then placed in a heating mantle enclosure and heated to 300° C. The reaction could only be stirred when the reagents started to melt/dissolve. After three minutes of stirring the melted reagents, vacuum was applied to remove water byproduct. After 15 minutes total reaction time, the brown liquid product was poured into a teflon tray whereupon it cooled to form a smooth brown glass-like solid. The reaction produced 36.3 g of product giving a 93% yield. $^1$H NMR (δ, D6-DMSO): 8.10-7.25 (m, 31H).

Examples 9-12

General Procedure for Organoclay Composition Preparation

An inorganic clay (sodium montmorillonite, "Na-MMT", available from Southern Clay, Inc.) was slurried in 75 volumes deionized water ("MilliQ water") with respect to the weight of clay and stirred at room temperature (22-25° C.) for 1 hour and then at 90-95° C. for 1 hour. The solution of organophosphonium salt from Examples 36 in methanol or acetonitrile was then added portionwise to the slurry of the inorganic clay the reaction mass was stirred for 18-20 hrs at 65-95° C. Upon cooling the crude organoclay composition was filtered and washed until the washing were free of halide and then dried at 125-150° C. to constant weight to yield the structures shown in Table 3.

TABLE 3

| Ex. No. | Structure |
|---|---|
| 9 | [structure showing bisphenol-A derived phthalimide with N-(3-triphenylphosphonium)phenyl group, MMT-] |

TABLE 3-continued

| Ex. No. | Structure |
|---|---|
| 10 | 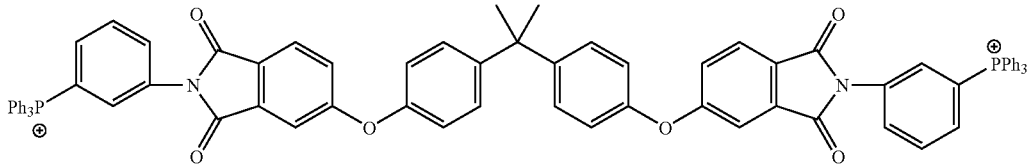 MMT- |
| 11 | 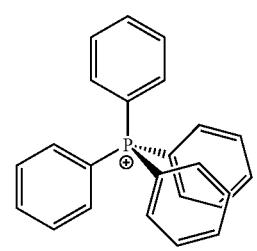 MMT- |
| 12 | 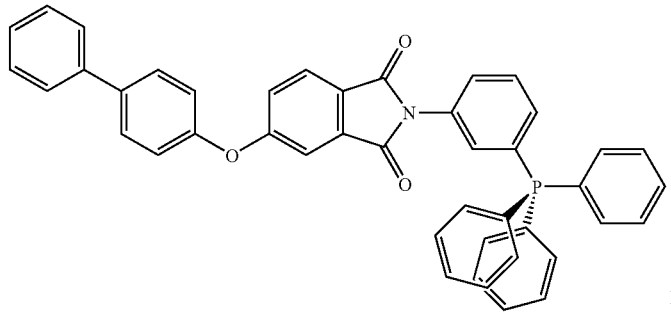 MMT- |

Example 12

Specific Procedure for Synthesis of BiphenylPA-mATPP-MMT

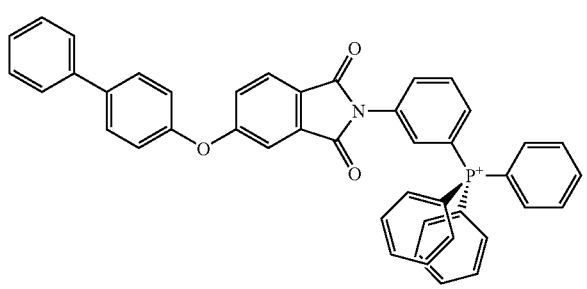

BiphenylPA-mATPP-I: MW=779.6

A 3 L round-bottom flask equipped with a mechanical stirrer was charged sodium montmorillonite (20 g, 0.021 mol. eqv.) and deionized water (1.6 L). The solution was stirred & heated to 85° C., and the sodium montmorillonite was well dispersed. A 60° C. solution of BiphenylPA-mATPP-I (17.9 g, 0.023 mole) in acetonitrile (360 mL) was added to the suspension of sodium montmorillonite over 10 min. After the addition of the salt solution the reaction mixture was stirred at 85° C. for another 3 hours. The modified montmorillonite was collected by filtration, and washed with hot water (2 L, 80° C.) to remove the inorganic salt impurity. The modified clay was further purified by re-dispersing it in acetonitrile (1.5 L) at 60° C., followed by filtration to remove the excess pyridinium salt. The purified clay was dried under vacuum for 24 hours at 150° C. and was milled to give a fine powder (27.9 g, 88% yield).

Examples 13-21

Solution Exfoliation of Modified Organoclays

Examples 13-21 were prepared using the following protocol. The modified nanosilicate samples were suspended in 25 g of solvent at 4.6% silicate by weight. The sample was homogenized using a rotor-stator homogenizer, 10 mm sawtooth tip at about 9,000 RPM for 10 minutes. After homogenization, the samples appeared well-dispersed. They were then sonicated using a Sonics VCF1500W sonicator fitted with a ½" sonic horn for 10 minutes. XRD analysis was performed on the sonicated nanosilicate/solvent mixture (see Table 4).

TABLE 4

Increase in d-spacing for nanoclays in solvent

| Ex. No. | Modifier/Clay system | Solvent | Dry powder d-spacing (angstroms) | d-spacing after homogenization (angstroms) | d-spacing after sonication (angstroms) |
|---|---|---|---|---|---|
| 13 | 9 | Anisole | 17.8 | 18.7 | Mostly/fully exfoliated |
| 14 | 9 | NMP | 17.8 | 85, 18.5 | Small peak at 18.5 |
| 15 | 9 | DMAc | 17.8 | 18.5 | 78, 51, small peak at 18.5 |
| 16 | 9 | Veratrole | 17.8 | 86, 60 | Peaks >40 |
| 17 | 8 | Anisole | 27 | 64, 40 | 29 |
| 18 | 8 | NMP | 27 | 49, 31, 27 | 60, 52, 45 |
| 19 | 7 | Veratrole | 25.5 | 83, 65, 46, 32 | Mostly/fully exfoliated |
| 20 | 10 | Anisole | 25 | >50 | Small peak at 29, some lgr peaks |
| 21 | 10 | Veratrole | 25 | Many >28 | Many >28 |

Examples 22-37

Formation of PEI Nanocomposites

A typical procedure for formation of polyetherimide nanocomposites follows. Sample compositions from Experiment 11-19 were suspended in polyetherimide solutions. The solvent was quickly removed at 400° C., films were pressed of these composites, and TEM analysis was performed (see Table 2 and Table 3). Clear differences in the degree of exfoliation were observed between various modified nanosilicates. Large differences in the TEM images were not observed between different types of PEIs or the different solvents studied.

Example 38-49

Film Extrusion of Solvent Blended PEI Nanocomposites

For film extrusion of this material, several batches of Cation/clay from Experiment 7 were sonicated in veratrole. Each batch contained 2.7% modified nanosilicate in 500 mL of veratrole. These mixtures were sonicated in a 1000 mL round-bottom flask submerged in a water bath using a Branson 450W Sonifier fitted with a ½" sonic probe at ~40% power output for about 16 hrs. Five batches were processed and combined. This material was solvent blended with a 20% by weight solution of BPADA-DDS polyetherimide in veratrole. This mixture was then precipitated in a blender in the presence of methanol, dried to remove the solvent in a 220° C. vacuum oven, blended with ODPA-DDS polyetherimide at the ratio of BPADA-DDS polyetherimide: ODPA-DDS polyetherimide described in Table 4, and extruded into film on a 16 mm PRISM extruder equipped with a venting/finishing screw and a 3-inch film die. The resin composition was fed at rate of about 0.5 lb per hour. The screw speed was set at 200 rpm, barrel temperature at 370° C., and film die temperature at 380° C. In examples 37-46, the ODPA-DDS polyetherimide was blended with the precipitated nanofilled BPADA-DDS polyetherimide and extruded. In Example 36 and Example 47, the ODPA-DDS polyetherimide was extruded one time prior to blending with the precipitated nanofilled BPADA-DDS polyetherimide. The mixture was then extruded a second time.

TABLE 5

Properties of Polyetherimide Nanocomposites prepared by Solution Blending

| | Final wt-% Silicate | Modifier/Clay System | Wt % silicate in the Solution Blended BPADA-DDS polyetherimide | Extrusions of ODPA-DDS Polyetherimide | ODPA-DDS polyetherimide: BPADA-DDS polyetherimide | TEM | CTE MD | CTE TD | Tg |
|---|---|---|---|---|---|---|---|---|---|
| 38 | 0 | | | Twice extruded | | | 58.2 | | |
| 39 | 5 | 7 | 5 | Once extruded | 0:100 | Yes | 48.68 | 50.92 | 233 |
| 40 | 10 | 7 | 10 | Once extruded | 0:100 | Yes | 38.41 | 41.76 | 226 |
| 41 | 0 | | | Once extruded | 31:69 | No | 48.51 | 53.1 | 262.8 |
| 42 | 7 | 7 | 15 | Once extruded | 31:69 | Yes | 33.02 | 36.04 | 252 |
| 43 | 0 | | | Once extruded | 60:40 | | 53 | 53 | |
| 44 | 3 | 7 | 10 | Once extruded | 60:40 | Yes | 45.95 | 43.09 | 267 |
| 45 | 5 | 7 | 15 | Once extruded | 60:40 | Yes | 38.88 | 39.72 | 260 |
| 46 | 7 | 7 | 15 | Once extruded | 60:40 | Yes | 38.54 | 39.25 | 258 |
| 47 | 7 | 7 | 15 | Once extruded | 60:40 | Yes | | | |
| 48 | 7 | 7 | 15 | Once extruded | 60:40 | Yes | 28.7 | 32.75 | 266 |
| 49 | 7 | 7 | 15 | Twice extruded | 60:40 | Yes | | | |

Figure 3:
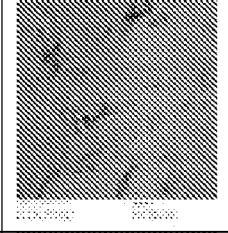
FIG. 3 shows TEM images of modified nanosilicates sonicated in various solvents and suspended in various polyetherimides.
Figure 3:
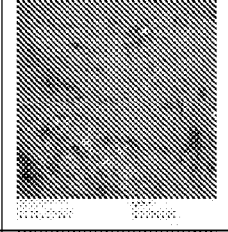
Figure 3:
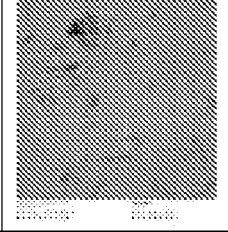
Figure 3:
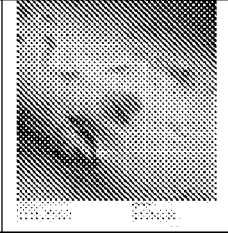
Figure 3:
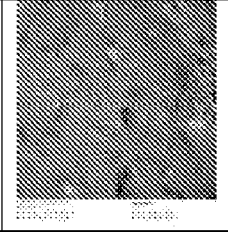

FIG. 3 shows the TEM evidence of the equivalence of the precipitation method (into non solvent) of solvent removal to the direct devolatization method. The resulting film had a nanosilicate loading of 7%, a machine direction CTE of 33.0 ppm/° C., and a $T_g$ of 255° C. A film with the same ratio of BPADA-DDS polyetherimide to ODPA-DDS polyetherimide with no clay has a machine direction CTE of 48.5 ppm/° C. and a $T_g$ of 262° C. A film was also extruded with an BPADA-DDS polyetherimide: to ODPA-DDS polyetherimide of 60:40 and a nanosilicate loading of 7%. That film had a machine direction CTE of 28.7 ppm/° C. and a $T_g$ of 266° C.

Example 50

Preparation of PEI Nanocomposites Using a Flow-through Sonicator

Figure 4:
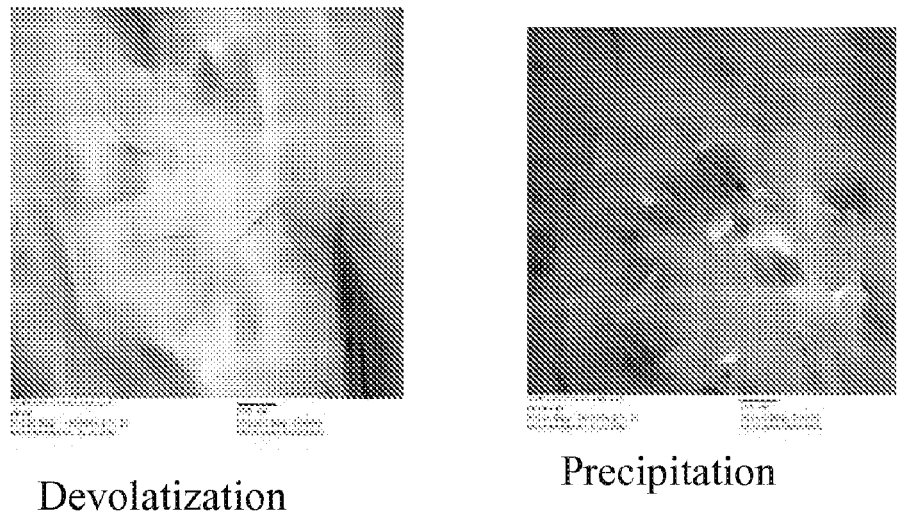
FIG. 4 shows TEM images illustrating the equivalence of exfoliation between devolatization and precipitation isolation routes.
Figure 5:
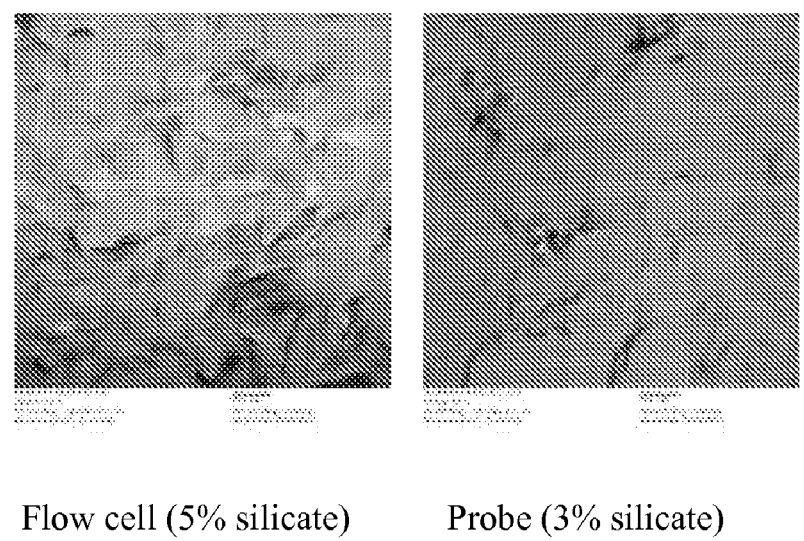
FIG. 5 shows a TEM comparison of cumyl-modified nanosilicate sonicated in a flow-cell sonicator and a probe-style sonicator.

Sonication in a flow cell has also been shown to be effective in exfoliation of the Example 7 nanosilicate in veratrole. A 2.7% solution of nanosilicate from Experiment 7 in 500 mL of veratrole was sonicated using an Advanced Sonics DRC-4-DPP-Hastelloy with a SAE-DRC-DPP Dual Frequency Reaction cell sonicator. The nanosilicate/veratrole mixture was pumped through the sonicator at 10 mL/min, one pass at a time. Twenty-five passes were performed, and the total time in the sonic zone of the flow cell reactor was 37.5 minutes. The sonicated nanosilicate/veratrole mixture was suspended in a 20% BPADA-DDS polyetherimide solution in veratrole, precipitated in methanol, placed in 220° C. vacuum oven to remove excess solvent, pressed into a film, and analyzed by TEM for exfoliation. FIG. 4 shows the comparison of the film made Experiment 7 nanosilicate sonicated in the flow-cell to the film made from the Experiment 7 sonicated in a batch mode using the probe sonicator. These two methods give equivalent results by TEM.

Example 51

Detailed Example of Solvent Cast Film with Nano Filler for Lowering CTE

Cloisite 30B clay from Southern Clay was dispersed in N,N-dimethylacetamide (DMAc) (13 g of clay in 5001 mL of solvent) by high shear mixing with a Silverson mixer. The monomers, 4,4'-oxydiphthalic anhydride (0.5640 g), 4,4-diaminodiphenylsulfone (0.3611 g), and oxydianiline (0.0903 g) were added to the clay dispersion and the mixture was diluted with additional DMAc to give a final mixture of 12.5% solids (polymer to solvent) and 3% filler (clay to polymer). The vial was inerted with $N_2$ and shaken overnight to form a viscous polyamic acid solution. This solution was then cast upon precleaned glass microscope slides and imidized using the heating profile described previously. The resulting nano filled polyimide film was peeled from the glass substrate for testing. The resulting film had a $T_g$=304C and a CTE of 44 ppm/C.

All patents, patent applications, and other publications disclosed herein are incorporated by reference in their entirety as though set forth in full.

While the invention has been described with reference to preferred embodiment, it will be understood by those skilled in the art that various changes may be made, and equivalents substituted, for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out the present invention, but that the invention will include all embodiments falling within the scope of the appended claims.

What is claimed is:

1. A method for preparing a polymer-organoclay composite composition, comprising:
    combining a solvent and an unexfoliated organoclay to provide a first mixture, wherein the unexfoliated organoclay comprises alternating inorganic silicate layers and organic layers, and has an initial spacing between the silicate layers;
    exposing the first mixture to an energized condition of a sufficient intensity and duration to increase the initial spacing of the inorganic silicate layers, to provide a second mixture;
    contacting the second mixture with a thermoplastic polymer composition so that the polymer composition fills at least one region located between at least one pair of silicate layers, wherein the polymer composition is at least partially soluble in the solvent; and
    removing at least a portion of the solvent from the second mixture, wherein the inorganic silicate layers remain separated by the polymer after removal of the solvent,
    wherein the organoclay comprises a quaternary organic cation of formula (2), formula (3), formula (4) or formula (5):

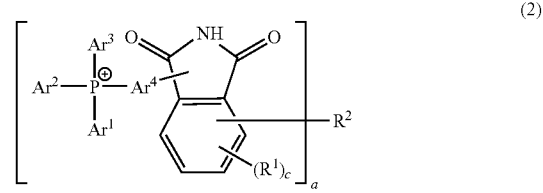

wherein $Ar^1$, $Ar^2$, $Ar^3$ and $Ar^4$ are independently $C_6$-$C_{50}$ aromatic radicals; "a" is a number from 1 to about 200; "c" is a number from 0 to 3; $R^1$ is independently at each occurrence a halogen atom, a $C_1$-$C_{20}$ aliphatic radical, a $C_5$-$C_{20}$ cycloaliphatic radical, or a $C_2$-$C_{20}$ aromatic radical; and $R^2$ is a $C_1$-$C_{20}$ aliphatic radical, a $C_5$-$C_{20}$ cycloaliphatic radical, a $C_6$-$C_{50}$ aromatic radical, or a polymer chain,

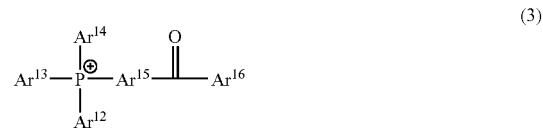

wherein $Ar^{12}$, $Ar^{13}$, $Ar^{14}$ and $Ar^{15}$ are independently $C_6$-$C_{50}$ aromatic radicals; and $Ar^{16}$ is a $C_6$-$C_{200}$ aromatic radical, or a polymer chain comprising at least one aromatic group,

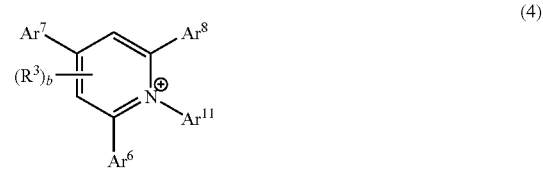

wherein $Ar^6$, $Ar^7$, and $Ar^8$ are independently $C_6$-$C_{50}$ aromatic radicals; "b" is a number from 0 to 2; $R^3$ is independently at each occurrence a halogen atom, a $C_1$-$C_{20}$ aliphatic radical, a $C_5$-$C_{20}$ cycloaliphatic radical, or a $C_2$-$C_{20}$ aromatic radical; and $Ar^{11}$ is a $C_6$-$C_{200}$ aromatic radical, or a polymer chain comprising at least one aromatic group,

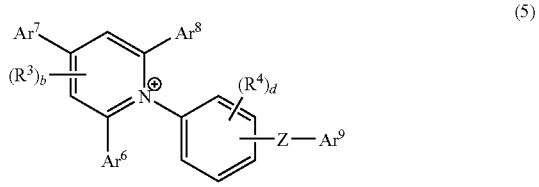

(5)

wherein $Ar^6$, $Ar^7$, and $Ar^8$ are independently $C_6$-$C_{50}$ aromatic radicals; "b" is a number from 0 to 2; "d" is a number from 0 to 4; $R^3$ and $R^4$ are independently at each occurrence a halogen atom, a $C_1$-$C_{20}$ aliphatic radical, a $C_5$-$C_{20}$ cycloaliphatic radical, or a $C_6$-$C_{20}$ aromatic radical; Z is a bond, a divalent $C_1$-$C_{20}$ aliphatic radical, a divalent $C_5$-$C_{20}$ cycloaliphatic radical, a divalent $C_6$-$C_{20}$ aromatic radical, an oxygen linking group, a sulfur linking group, a $SO_2$ linking group, or a Se linking group; and $Ar^9$ is a $C_{10}$-$C_{200}$ aromatic radical, or a polymer chain comprising at least one aromatic group.

2. The method of claim 1, wherein the energized condition is produced by a sonic energy source.

3. The method of claim 1, wherein the source of sonic energy is an ultrasonic liquid processor.

4. The method of claim 1, wherein the energized condition is produced by a high shear mixer.

5. The method of claim 1, wherein the energy is of sufficient intensity and duration to effect a net increase in the initial d-spacing of the organoclay.

6. The method of claim 1, wherein the first mixture is exposed to an energized condition of sufficient intensity and duration to increase the initial spacing of the inorganic silicate layers by an amount from 5 Angstroms to 90 Angstroms.

7. The method of claim 1, wherein the increase in the initial spacing of the inorganic silicate layers results in random spacing of the inorganic silicate layers.

8. The method of claim 1, wherein the net increase in the initial d-spacing of the organoclay is from about 10 to about 500 percent.

9. The method of claim 1, wherein the organoclay further comprises a quaternary organic cation of formula (1):

(1)

wherein Q is nitrogen or phosphorous; and $R^7$, $R^8$, $R^9$, and $R^{10}$ are independently a $C_1$-$C_{20}$ aliphatic radical, a $C_5$-$C_{20}$ cycloaliphatic radical, a $C_2$-$C_{20}$ aromatic radical, or a polymer chain.

10. The method of claim 1, wherein the organoclay comprises a quaternary phosphonium cation of formula (2):

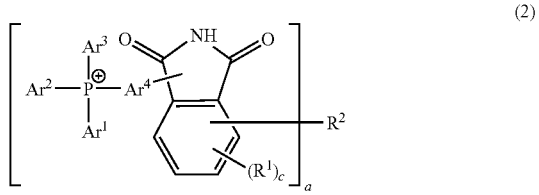

(2)

wherein $Ar^1$, $Ar^2$, $Ar^3$ and $Ar^4$ are independently $C_6$-$C_{50}$ aromatic radicals; "a" is a number from 1 to about 200; "c" is a number from 0 to 3; $R^1$ is independently at each occurrence a halogen atom, a $C_1$-$C_{20}$ aliphatic radical, a $C_5$-$C_{20}$ cycloaliphatic radical, or a $C_2$-$C_{20}$ aromatic radical; and $R^2$ is a $C_1$-$C_{20}$ aliphatic radical, a $C_5$-$C_{20}$ cycloaliphatic radical, a $C_6$-$C_{50}$ aromatic radical, or a polymer chain.

11. The method of claim 1, wherein the organoclay comprises a quaternary phosphonium cation of formula (3):

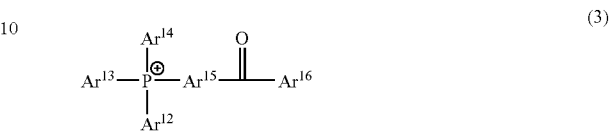

(3)

wherein $Ar^{12}$, $Ar^{13}$, $Ar^{14}$ and $Ar^{15}$ are independently $C_6$-$C_{50}$ aromatic radicals; and $Ar^{16}$ is a $C_6$-$C_{200}$ aromatic radical, or a polymer chain comprising at least one aromatic group.

12. The method of claim 1, wherein the organoclay comprises a pyridinium cation of formula (4):

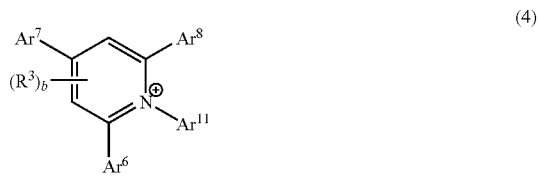

(4)

wherein $Ar^6$, $Ar^7$, and $Ar^8$ are independently $C_6$-$C_{50}$ aromatic radicals; "b" is a number from 0 to 2; $R^3$ is independently at each occurrence a halogen atom, a $C_1$-$C_{20}$ aliphatic radical, a $C_5$-$C_{20}$ cycloaliphatic radical, or a $C_2$-$C_{20}$ aromatic radical; and $Ar^{11}$ is a $C_6$-$C_{200}$ aromatic radical, or a polymer chain comprising at least one aromatic group.

13. The method of claim 12, wherein the organoclay comprises a quaternary pyridinium cation of formula (5):

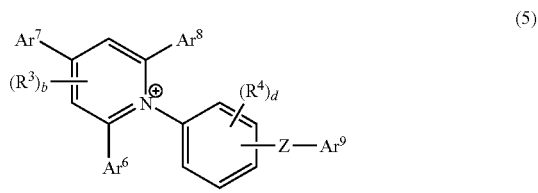

(5)

wherein $Ar^6$, $Ar^7$, and $Ar^8$ are independently $C_6$-$C_{50}$ aromatic radicals; "b" is a number from 0 to 2; "d" is a number from 0 to 4; $R^3$ and $R^4$ are independently at each occurrence a halogen atom, a $C_1$-$C_{20}$ aliphatic radical, a $C_5$-$C_{20}$ cycloaliphatic radical, or a $C_6$-$C_{20}$ aromatic radical; Z is a bond, a divalent $C_1$-$C_{20}$ aliphatic radical, a divalent $C_5$-$C_{20}$ cycloaliphatic radical, a divalent $C_6$-$C_{20}$ aromatic radical, an oxygen linking group, a sulfur linking group, a $SO_2$ linking group, or a Se linking group; and $Ar^9$ is a $C_{10}$-$C_{200}$ aromatic radical, or a polymer chain comprising at least one aromatic group.

14. The method of claim 1, wherein the inorganic silicate layers are derived from an inorganic clay selected from the group consisting of kaolinite, dickite, nacrite, halloysite, antigorite, chrysotile, pyrophyllite, montmorillonite, beidellite, nontronite, saponite, sauconite, stevensite, hectorite, tetrasilylic mica, sodium taeniolite, muscovite, margarite, talc, vermiculite, phlogopite, xanthophyllite, chlorite, synthetic silicates, and a combination thereof.

15. The method of claim 1, wherein the solvent is selected from the group consisting of N,N-dimethylacetamide, N,N- dimethylformamide, N-methylpyrolidinone, dimethylsulfoxide, sulfolane, tetrahydrofuran, benzophenone, cyclohexanone, phenol, o-cresol, p-cresol, m-cresol, phenol, ethylphenol, isopropylphenol, t-butylphenol, xylenol, mesitol, chlorophenol, dichlorophenol, phenylphenol, a monoalkyl ether of ethylene glycol having from 1 to about 4 carbon atoms in the alkyl group, a monoalkyl ether of diethylene glycol having from 1 to about 4 carbon atoms in the alkyl group, a monoaryl ether glycol, a monoaryl ether of propylene glycol, tetramethylurea, phenoxy ethanol, propylene glycol phenyl ether, anisole, veratrole, o-dichlorobenzene, chlorobenzene, trichloroethane, methylene chloride, chloroform, pyridine, N-cyclohexylpyrrolidinone, ethyl lactate, an ionic liquid, and a combination thereof.

16. The method of claim 1, wherein the polymer-organoclay composite comprises a polymer selected from the group consisting of polyvinylchloride, a polyolefin, a polyester, a polyamide, a polysulfone, a polyimide, a polyetherimide, a polyether sulfone, a polyphenylene sulfide, a polyether ketone, a polyether ether ketone, an acrylonitrile-butadiene-styrene, a polystyrene, a polybutadiene, a polyacrylate, a polyalkylacrylate, a polyacrylonitrile, a polyacetal, a polycarbonate, a polyphenylene ether, an ethylene-vinyl acetate copolymer, a polyvinyl acetate, a liquid crystalline polymer, an aromatic polyester, an ethylene-tetrafluoroethylene copolymer, a polyvinyl fluoride, a polyvinylidene fluoride, a polyvinylidene chloride, a polytetrafluoroethylene, and a combination comprising at least one of the foregoing polymers.

17. The method of claim 1, wherein the polymer-organoclay comprises a polyethersulfone.
18. The method of claim 1, wherein the polymer-organoclay composite comprises a polyimide.
19. The method of claim 1, wherein the polymer-organoclay composite comprises a polyetherimide.
20. The method of claim 1, wherein the polymer-organoclay composite comprises a polyether ketone.
21. The method of claim 1, wherein the polymer-organoclay composite comprises a polymer having a glass transition temperature from about 180° C. to about 450° C.
22. The method of claim 1, wherein removing at least a portion of the solvent is carried out in a devolatilizing extruder.
23. A method for preparing a polymer-organoclay composite composition, said method comprising:
  combining a solvent and an unexfoliated organoclay to provide a first mixture, wherein the organoclay comprises alternating inorganic silicate layers and organic layers, and a quaternary organic cation of formula (2), formula (3), formula (4) or formula (5)

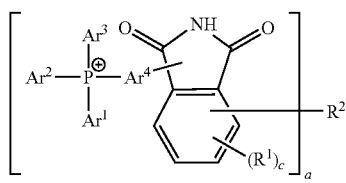

(2)

wherein $Ar^1$, $Ar^2$, $Ar^3$ and $Ar^4$ are independently $C_6$-$C_{50}$ aromatic radicals; "a" is a number from 1 to about 200; "c" is a number from 0 to 3; $R^1$ is independently at each occurrence a halogen atom, a $C_1$-$C_{20}$ aliphatic radical, a $C_5$-$C_{20}$ cycloaliphatic radical, or a $C_2$-$C_{20}$ aromatic radical; and $R^2$ is a $C_1$-$C_{20}$ aliphatic radical, a $C_5$-$C_{20}$ cycloaliphatic radical, a $C_6$-$C_{50}$ aromatic radical, or a polymer chain,

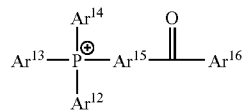

(3)

wherein $Ar^{12}$, $Ar^{13}$, $Ar^{14}$ and $Ar^{15}$ are independently $C_6$-$C_{50}$ aromatic radicals; and $Ar^{16}$ is a $C_6$-$C_{200}$ aromatic radical, or a polymer chain comprising at least one aromatic group,

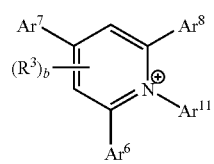

(4)

wherein $Ar^6$, $Ar^7$, and $Ar^8$ are independently $C_6$-$C_{50}$ aromatic radicals; "b" is a number from 0 to 2; $R^3$ is independently at each occurrence a halogen atom, a $C_1$-$C_{20}$ aliphatic radical, a $C_5$-$C_{20}$ cycloaliphatic radical, or a $C_2$-$C_{20}$ aromatic radical; and $Ar^{11}$ is a $C_6$-$C_{200}$ aromatic radical, or a polymer chain comprising at least one aromatic group,

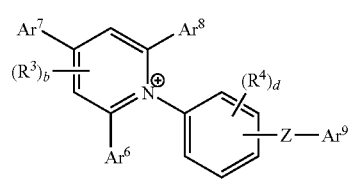

(5)

wherein $Ar^6$, $Ar^7$, and $Ar^8$ are independently $C_6$-$C_{50}$ aromatic radicals; "b" is a number from 0 to 2; "d" is a number from 0 to 4; $R^3$ and $R^4$ are independently at each occurrence a halogen atom, a $C_1$-$C_{20}$ aliphatic radical, a $C_5$-$C_{20}$ cycloaliphatic radical, or a $C_6$-$C_{20}$ aromatic radical; Z is a bond, a divalent $C_1$-$C_{20}$ aliphatic radical, a divalent $C_5$-$C_{20}$ cycloaliphatic radical, a divalent $C_6$-$C_{20}$ aromatic radical, an oxygen linking group, a sulfur linking group, a $SO_2$ linking group, or a Se linking group; and $Ar^9$ is a $C_{10}$-$C_{200}$ aromatic radical, or a polymer chain comprising at least one aromatic group and wherein the organoclay further has an initial spacing between the silicate layers;
  exposing the first mixture to an energized condition to form a second mixture, wherein the energized condition is of a sufficient intensity and duration to effect a net increase the initial spacing of the inorganic silicate layers of the organoclay composition;
  contacting the second mixture with a polyimide that separates the inorganic silicate layers to form a third mixture, wherein the polyimide is at least partially soluble in the solvent; and
  removing at least a portion of the solvent from the third mixture, wherein the silicate layers remain separated by the polymer after removal of the solvent.

24. The method of claim 23, wherein the solvent is removed on a devolatilizing extruder.

* * * * *